US012684593B2

(12) United States Patent　　　　(10) Patent No.:　US 12,684,593 B2
Paz et al.　　　　　　　　　　　　　(45) Date of Patent:　　Jul. 14, 2026

(54) DOWNLINK CONTROL DATA FOR TRANSMIT EQUALIZATION WAVEFORMS

(71) Applicant: QUALCOMM Incorporated, San Diego, CA (US)

(72) Inventors: Daniel Paz, Atlit (IL); Michael Levitsky, Rehovot (IL); Tom Barak, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/427,714

(22) Filed: Jan. 30, 2024

(65) Prior Publication Data

US 2025/0247857 A1　　Jul. 31, 2025

(51) Int. Cl.
*H04W 72/25*　　(2023.01)
*H04B 7/06*　　(2006.01)
*H04L 1/00*　　(2006.01)
(52) U.S. Cl.
CPC .......... *H04W 72/25* (2023.01); *H04B 7/0626* (2013.01); *H04B 7/063* (2013.01); *H04L 1/0003* (2013.01)

(58) Field of Classification Search
CPC .... H04B 7/0634; H04B 7/063; H04B 7/0626; H04L 1/0003; H04W 72/25
See application file for complete search history.

(56) References Cited

U.S. PATENT DOCUMENTS 7,978,759 B1 *　7/2011　Sarrigeorgidis .. H04L 25/03159
　　　　　　　　　　　　　　　　　　708/320

FOREIGN PATENT DOCUMENTS

CA　　　　3086801 A1 *　7/2019　............ H04W 72/20
EP　　　　3780411 A1 *　2/2021　......... H04B 7/06956
WO　WO-2023049613 A1 *　3/2023　........... H04B 7/0456

* cited by examiner

*Primary Examiner* — James P Duffy
(74) *Attorney, Agent, or Firm* — Procopio, Cory, Hargreaves & Savitch LLP

(57)　　　　　　　ABSTRACT
Method and apparatus for downlink control channel for transmit equalization waveforms for XR devices. The apparatus configures a payload comprising at least sidelink control data and a transmit equalization matrix for transmission within a transmit pre-equalization refresh period. The sidelink control data comprising at least one of a first part or a second part. The apparatus applies an equalization procedure to the payload based at least on the transmit equalization matrix. The apparatus transmits, to a second wireless device, the payload comprising at least the sidelink control data and the transmit equalization matrix.

30 Claims, 16 Drawing Sheets

400

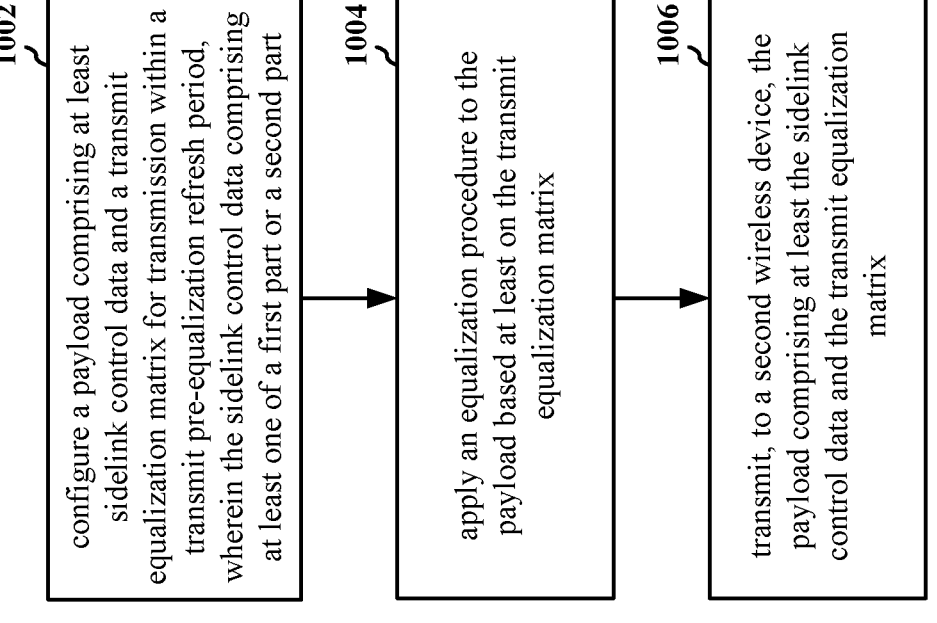

1002 configure a payload comprising at least sidelink control data and a transmit equalization matrix for transmission within a transmit pre-equalization refresh period, wherein the sidelink control data comprising at least one of a first part or a second part 1004 apply an equalization procedure to the payload based at least on the transmit equalization matrix 1006 transmit, to a second wireless device, the payload comprising at least the sidelink control data and the transmit equalization matrix

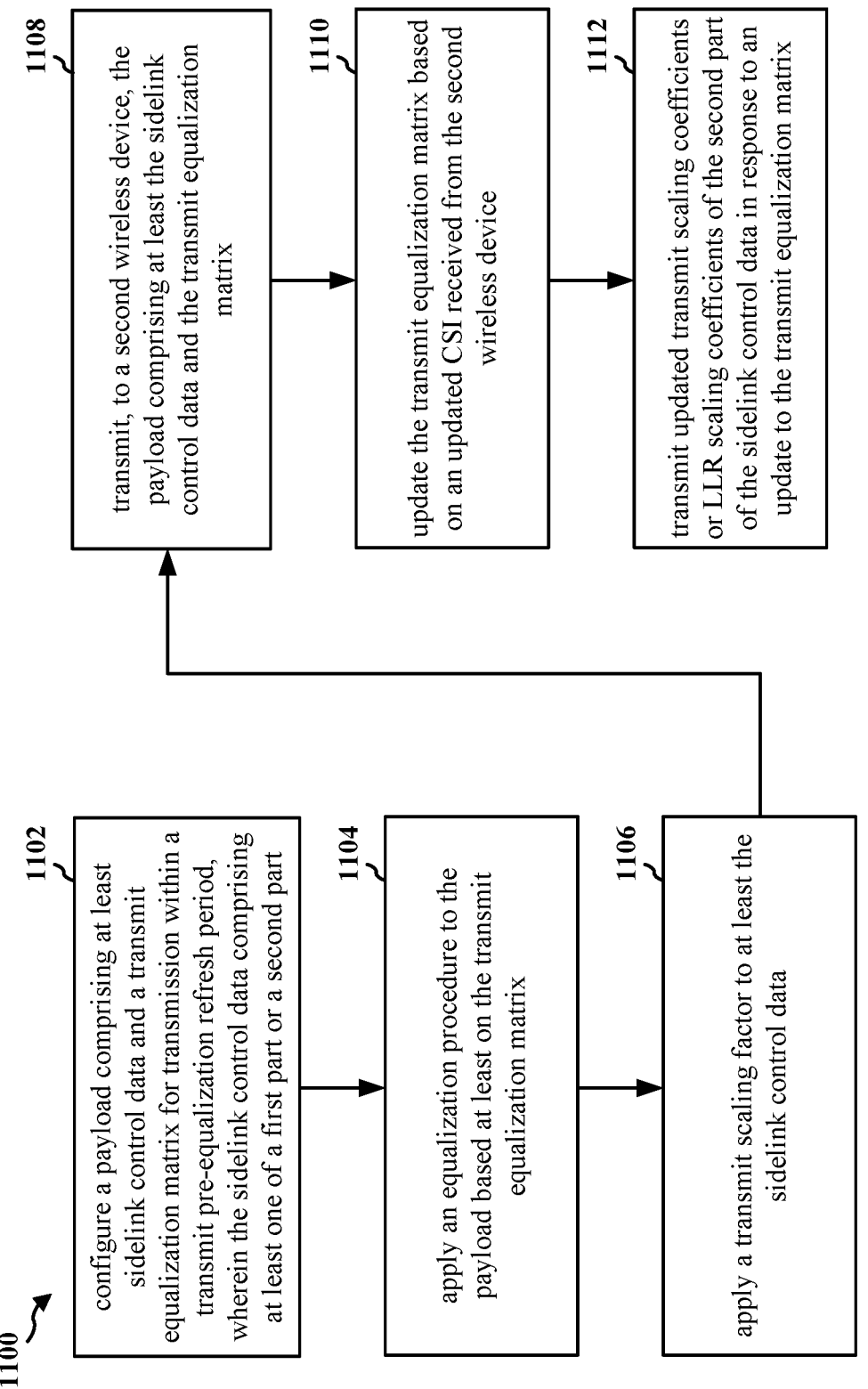

1100

1102 configure a payload comprising at least sidelink control data and a transmit equalization matrix for transmission within a transmit pre-equalization refresh period, wherein the sidelink control data comprising at least one of a first part or a second part 1104 apply an equalization procedure to the payload based at least on the transmit equalization matrix 1106 apply a transmit scaling factor to at least the sidelink control data 1108 transmit, to a second wireless device, the payload comprising at least the sidelink control data and the transmit equalization matrix 1110 update the transmit equalization matrix based on an updated CSI received from the second wireless device 1112 transmit updated transmit scaling coefficients or LLR scaling coefficients of the second part of the sidelink control data in response to an update to the transmit equalization matrix

FIG. 11

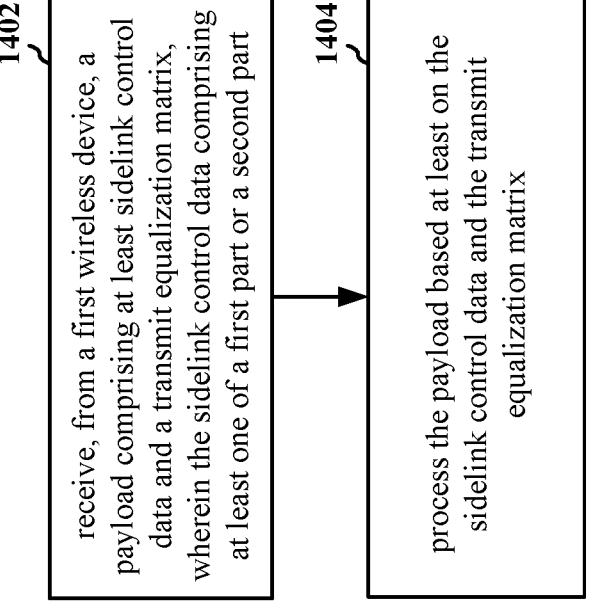
1402
receive, from a first wireless device, a payload comprising at least sidelink control data and a transmit equalization matrix, wherein the sidelink control data comprising at least one of a first part or a second part
1404
process the payload based at least on the sidelink control data and the transmit equalization matrix
1400
FIG. 14

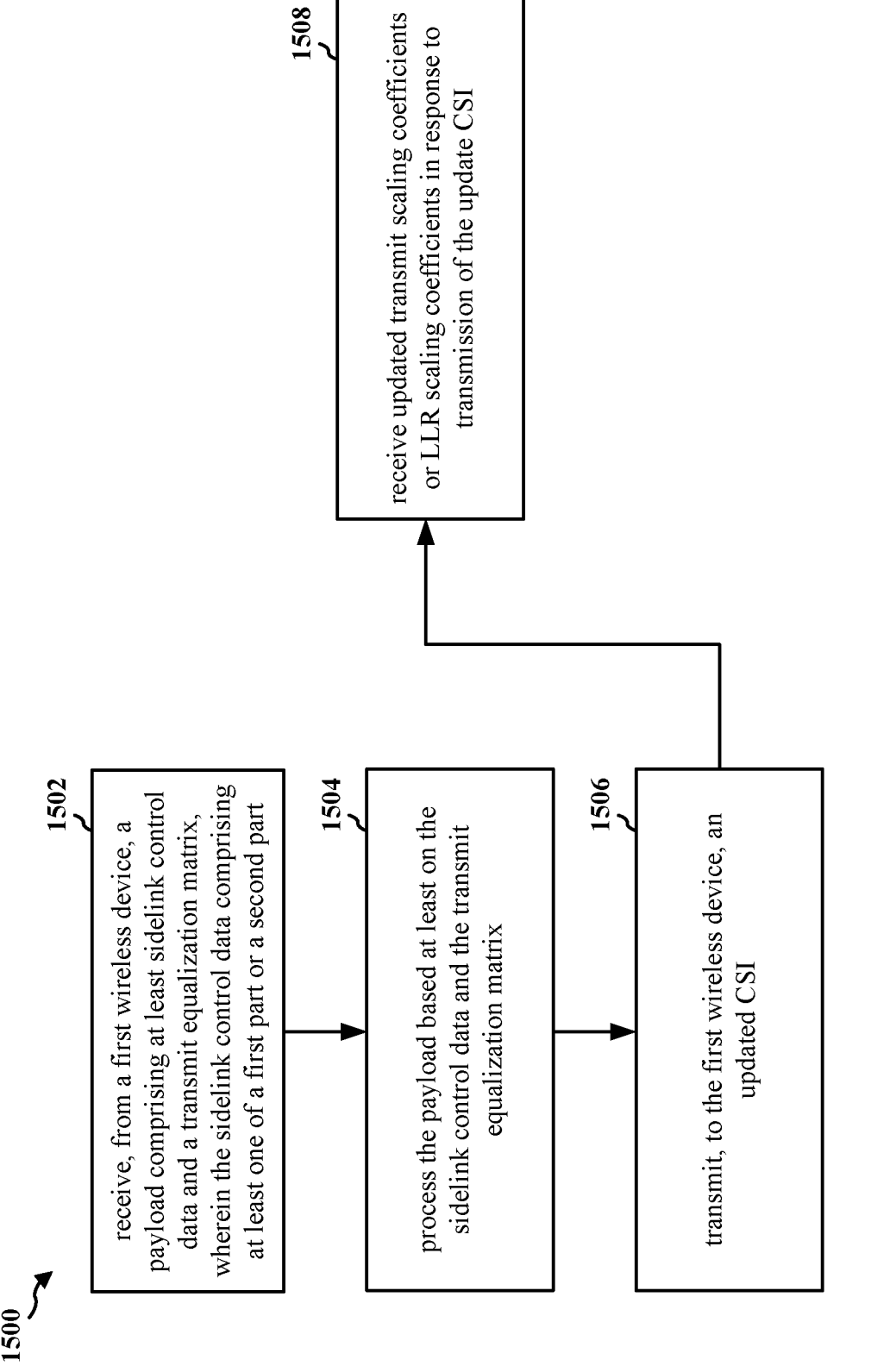

1502 — receive, from a first wireless device, a payload comprising at least sidelink control data and a transmit equalization matrix, wherein the sidelink control data comprising at least one of a first part or a second part 1504 — process the payload based at least on the sidelink control data and the transmit equalization matrix 1506 — transmit, to the first wireless device, an updated CSI 1508 — receive updated transmit scaling coefficients or LLR scaling coefficients in response to transmission of the update CSI

DOWNLINK CONTROL DATA FOR TRANSMIT EQUALIZATION WAVEFORMS

TECHNICAL FIELD

The present disclosure relates generally to communication systems, and more particularly, to a configuration for downlink control channel for transmit equalization waveforms.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first wireless device. The device may be a processor and/or a modem at a first wireless device or the first wireless device itself. The apparatus configures a payload comprising at least sidelink control data and a transmit equalization matrix for transmission within a transmit pre-equalization refresh period, wherein the sidelink control data comprising at least one of a first part or a second part. The apparatus applies an equalization procedure to the payload based at least on the transmit equalization matrix. The apparatus transmits, to a second wireless device, the payload comprising at least the sidelink control data and the transmit equalization matrix.

In an aspect of the disclosure, a method, a computer-readable medium, and an apparatus are provided. The apparatus may be a device at a second wireless device. The device may be a processor and/or a modem at a second wireless device or the second wireless device itself. The apparatus receives, from a first wireless device, a payload comprising at least sidelink control data and a transmit equalization matrix, wherein the sidelink control data comprising at least one of a first part or a second part. The apparatus process the payload based at least on the sidelink control data and the transmit equalization matrix.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10 is a flowchart of a method of wireless communication.

FIG. 11 is a flowchart of a method of wireless communication.

FIG. 14 is a flowchart of a method of wireless communication.

FIG. 15 is a flowchart of a method of wireless communication.

DETAILED DESCRIPTION

Figure 1:
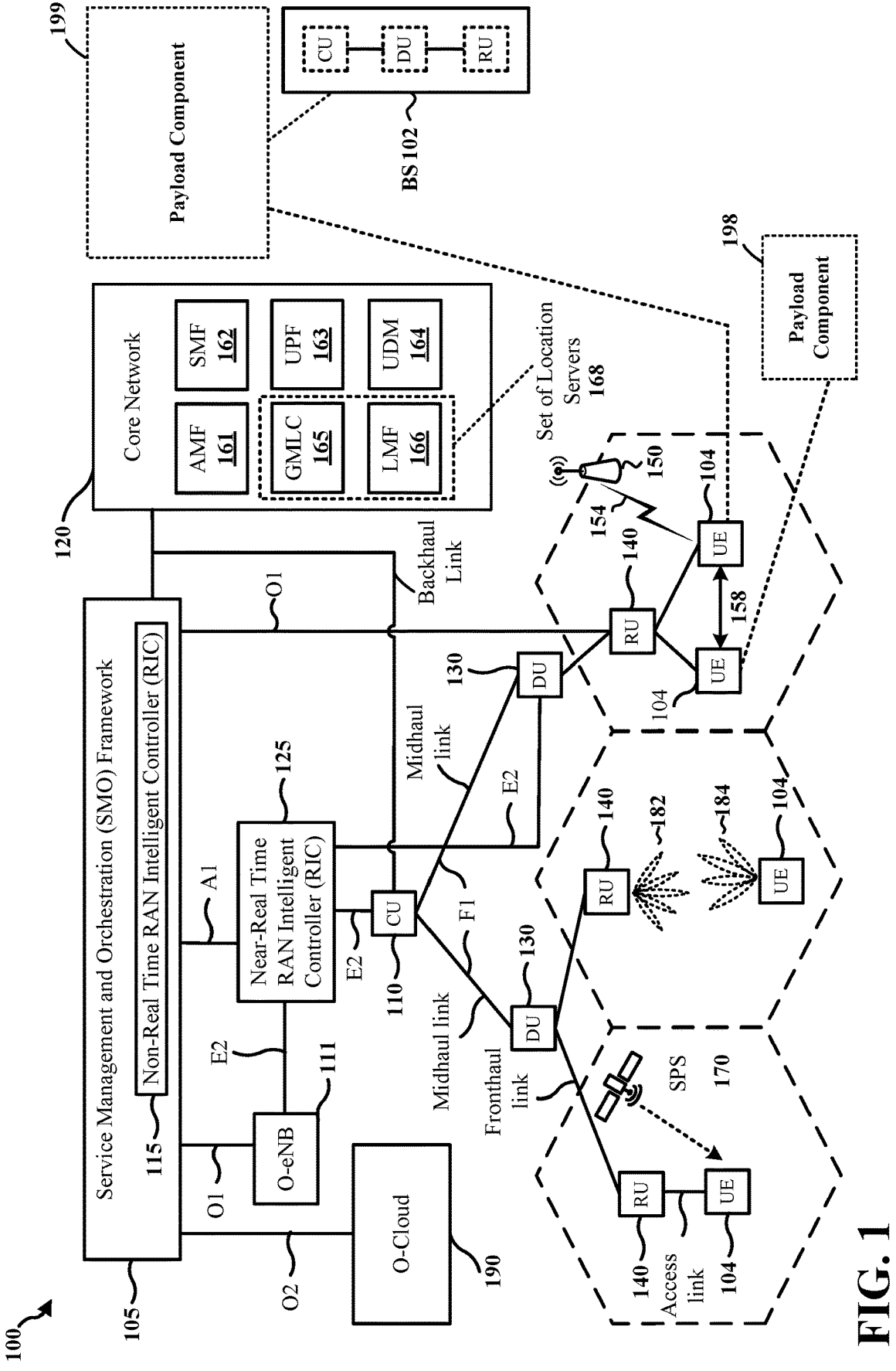
FIG. 1 is a diagram illustrating an example of a wireless communications system and an access network.

The popularity of virtual reality (VR), augmented reality (AR), and mixed reality (MR) technologies is growing at a fast pace and may be widely adopted for applications other than gaming. There is an increase demand for XR devices (e.g., XR goggles or headsets) having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life.

XR devices have the potential to be one of the leading products in the personal electronics segment and may be one of the growth factors in the personal electronics segment. XR technology encounters challenges and unsolved limiting issues which may need to be addressed before it will be ready for a massive commercialization and market penetration. Some issues encountered by XR technology include limited processing complexity, limited power consumption, or battery lifetime for XR devices. Application usage of high form factor XR devices (e.g., goggles, head mounted displays) may not be convenient, such that part of XR related processing should be shifted to a companion device (e.g., UE) with a split XR approach to reduce complexity on XR device.

Aspects presented herein provide a configuration for downlink control data to support transmit equalization based waveforms. For example, the downlink control data may be configured to enable or support a low complexity, low power, high bit rate sidelink over ultra-wideband (UWB) frequency ranges for XR devices.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF)

access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-e) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a payload component 198 that may be configured to receive, from a first wireless device, a payload comprising at least sidelink control data and a transmit equalization matrix, wherein the sidelink control data comprising at least one of a first part or a second part; and process the payload based at least on the sidelink control data and the transmit equalization matrix.

Referring again to FIG. 1, in certain aspects, the UE 104 or the base station 102 may comprise a payload component 199 that may be configured to configure a payload comprising at least sidelink control data and a transmit equalization matrix for transmission within a transmit pre-equalization refresh period, wherein the sidelink control data comprising at least one of a first part or a second part; apply an equalization procedure to the payload based at least on the transmit equalization matrix; and transmit, to a second wireless device, the payload comprising at least the sidelink control data and the transmit equalization matrix.

Although the following description may be focused on 5G NR, the concepts described herein may be applicable to other similar areas, such as LTE, LTE-A, CDMA, GSM, and other wireless technologies.

Figures 2A, 2B, 2C, 2D:
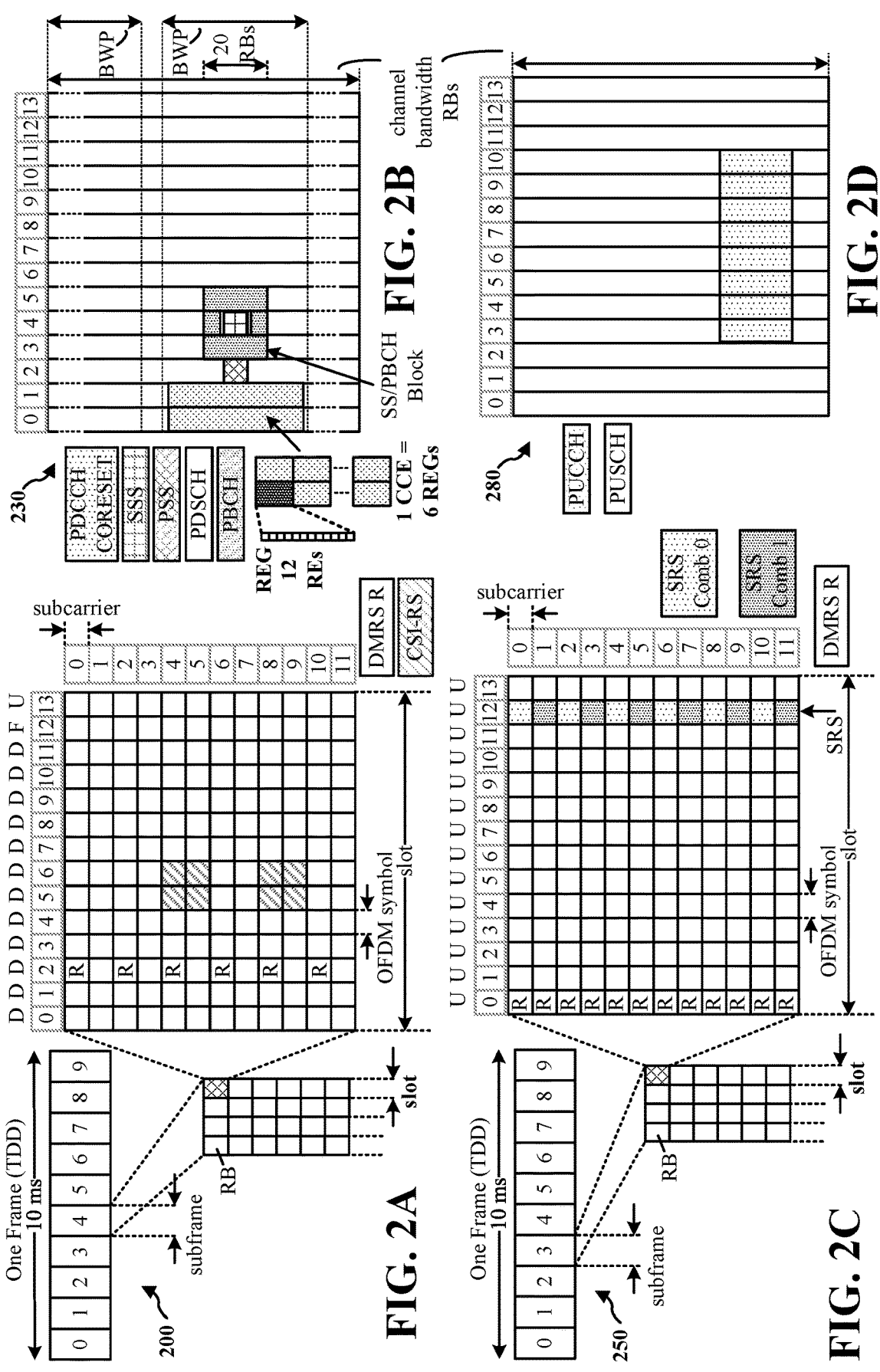
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^\mu \cdot 15$ [kHz] | Cyclic prefix |
|---|---|---|
| 0 | 15 | Normal |
| 1 | 30 | Normal |

TABLE 1-continued

Numerology, SCS, and CP

| μ | SCS<br>$\Delta f = 2^\mu \cdot 15$ [kHz] | Cyclic prefix |
|---|---|---|
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
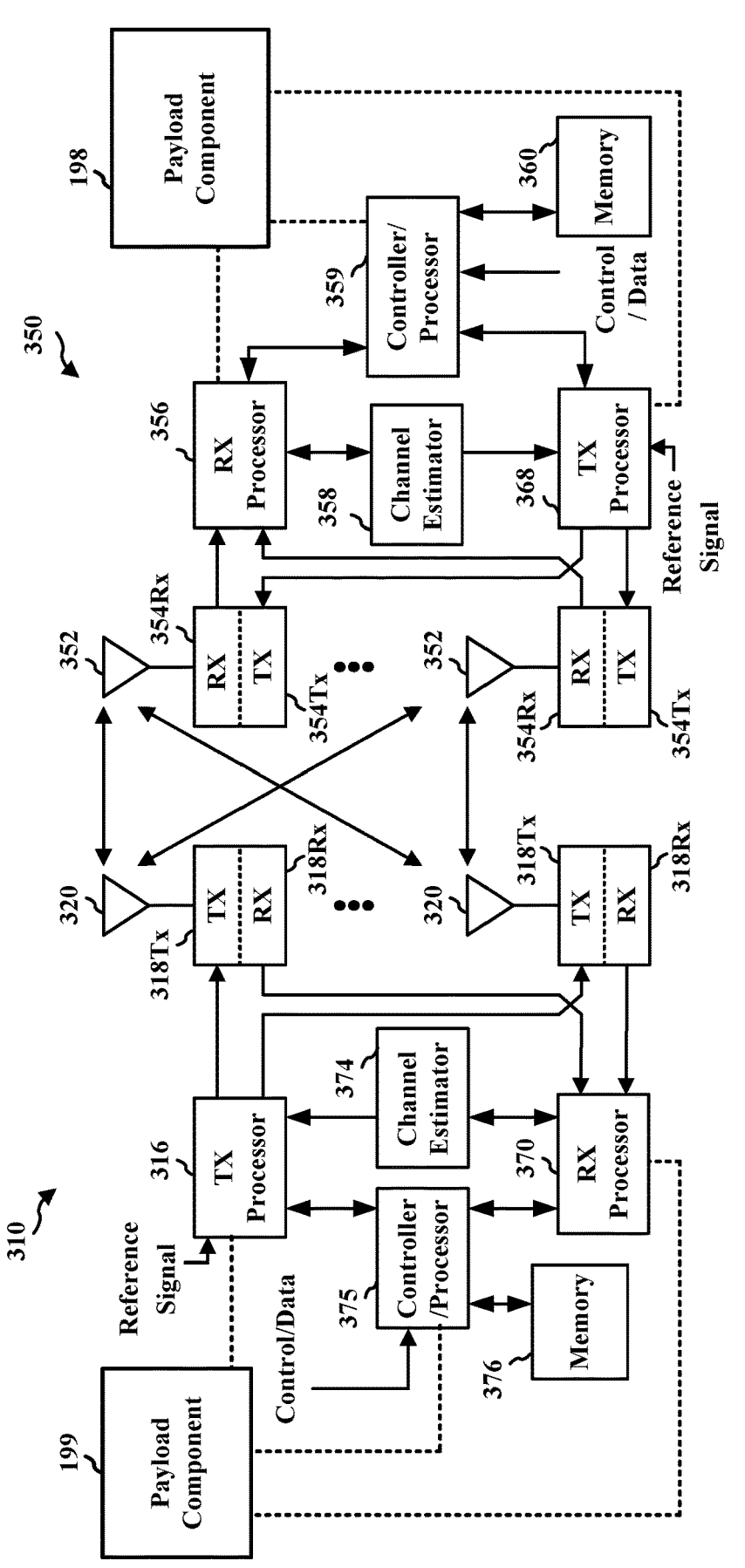
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the payload component 199 of FIG. 1.

At least one of the TX processor 316, the RX processor 370, and the controller/processor 375 may be configured to perform aspects in connection with the payload component 198 of FIG. 1.

Wireless communication systems may support various types of wireless traffic. As one example of traffic that may be supported, XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

Figure 4B:
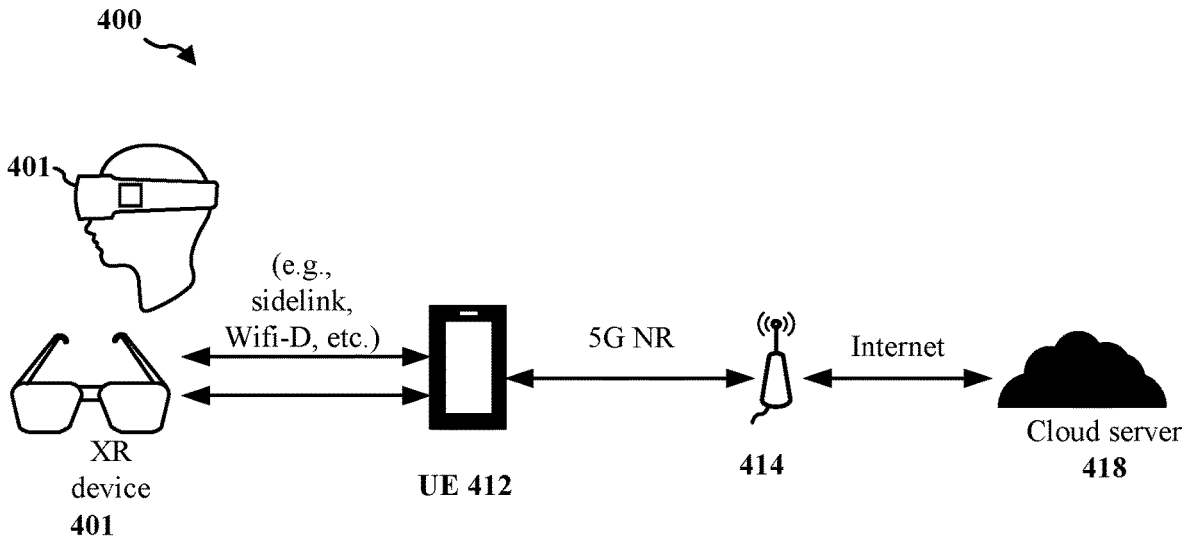
FIG. 4B is a diagram of wireless communications of XR devices.
Figure 4A:
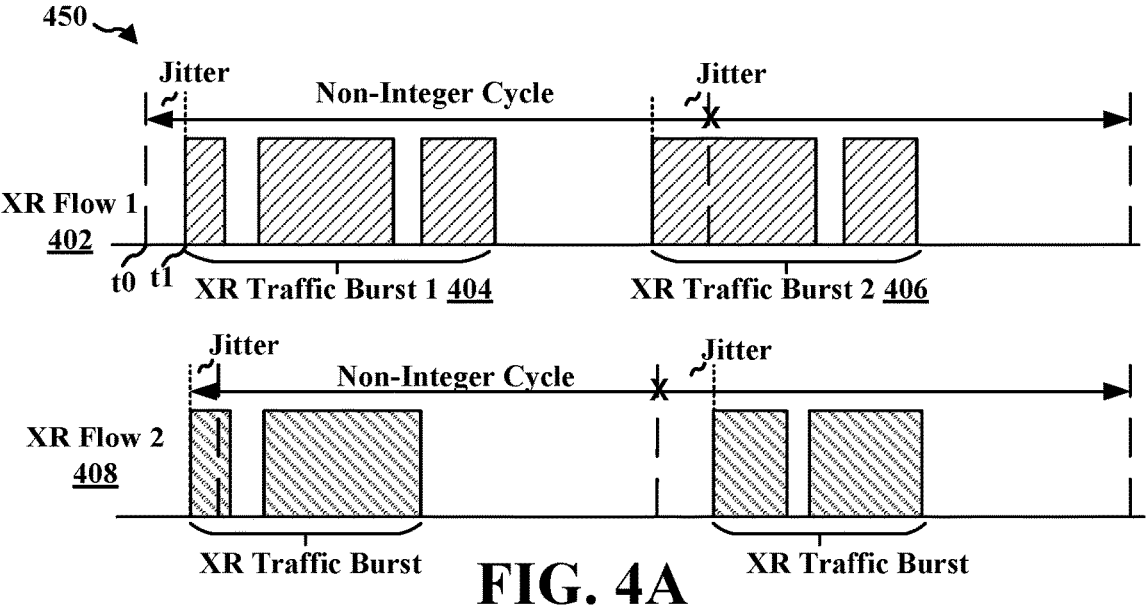
FIG. 4A is a diagram illustrating aspects of XR communication.

XR traffic may arrive in periodic traffic bursts ("XR traffic bursts"). An XR traffic burst may vary in a number of packets per burst and/or a size of each pack in the burst. FIG. 4A includes a diagram 450 illustrating a first XR flow 402 that includes a first XR traffic burst 404 and a second XR traffic burst 406. As illustrated in the diagram 450, the traffic bursts may include different numbers of packets, e.g., the first XR traffic burst 404 being shown with three packets (represented as rectangles in the diagram 450) and the second XR traffic burst 406 being shown with two packets. Furthermore, as illustrated in the diagram 450, the three packets in the first XR traffic burst 404 and the two packets in the second XR traffic burst 406 may vary in size, that is, packets within the first XR traffic burst 404 and the second XR traffic burst 406 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in $\frac{1}{60} = 16.67$ ms periods. In another example, for 120 FPS video data, XR traffic bursts may arrive in $\frac{1}{120} = 8.33$ ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time t0, but the first packet of the first XR traffic burst 404 arrives at time t1.

XR traffic may include multiple flows that arrive at a UE (or a base station) concurrently with one another (or within a threshold period of time). For instance, the diagram 450 includes a second XR flow 408. The second XR flow 408 may have different characteristics than the first XR flow 402. For instance, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

The popularity of VR, AR, and MR technologies is growing at a fast pace and may be widely adopted for applications other than gaming, such as but not limited to healthcare, education, social, retail, and many more. There is an increase demand for XR devices 401 (e.g., XR goggles or headsets), as shown for example in diagram 400 of FIG. 4B, having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life.

XR devices have the potential to be one of the leading products in the personal electronics segment and may be one of the growth factors in the personal electronics segment. XR technology encounters challenges and unsolved limiting issues which may need to be addressed before it will be ready for a massive commercialization and market penetration. For example, some issues encountered by XR technology for massive usage (e.g., comparable with smartphones, smartwatches, wireless earbuds) may include light weight appropriate for long-time usage "on the go" comparable with a regular glasses which have a weight of approximately 30-40 g. Another issue encountered by XR technology includes the limited processing complexity and power consumption to comply with the available heat dissipation ability of the XR device, which is much smaller than a UE, for example, since it is proportional to the surface size of XR device which is much smaller than a UE. In some instances, such as a smart wearable XR device (e.g., goggles or glasses), the power consumption limit from the point of view of heat dissipation may be limited to only few Watts. Yet another issue encountered by XR technology may be related to a reasonable power consumption to allow a light weight battery and a reasonable battery lifetime for XR devices. These issues may be challenging due in part to a heavy processing that is required to support many of XR applications. Stand alone XR products may not comply with the "on the go" requirements and may be relevant only for some specific applications and short time usage scenarios.

Since for most of applications/scenarios usage of high form factor XR devices (e.g., goggles, head mounted displays) is not convenient, part of XR related processing should be shifted to a companion device (e.g., UE) with a split XR approach to reduce complexity on XR device. Typical split XR approaches move most of the rendering related processing to the companion device, but many processing components are still left on XR device for different end-to-end (E2E) considerations (e.g., photon-to-motion latency requirement, XR to companion device wireless link capacity, communication link power consumption for long range links). The split XR option significantly reduces power consumption on XR device, the power consumption may still be too high even for a less demanding video quality/user experience benchmark and a less demanding applications, such that the split scenario may not completely solve the technology limiting factors and may not allow to support a more demanding premium XR applications (e.g., frame per second ≥120 Hz, video formats ≥8 k).

The split option may be utilized on long range communication links over licensed spectrum with a tight scheduling and staggering among different served XR users. Capacity per user may be a limitation for this case, and correspondingly, XR device should employ some sensors processing locally to reduce UL data volume. Additional critical sensors or cameras data from XR (e.g., UL) and the rendered video for XR device (e.g., DL) should be compressed with a very high compression factor, due in part to a limited link capacity per user. Sensor data pre-processing on XR devices and video compression with sufficiently high compression factor (e.g. high profile of H264) may have a very high complexity, especially for the encoder side, and may utilize extensive DDR usage for both the transmit and receive path video processing. Due to photon-to-motion latency and network entity (e.g., gNB) based split related latencies, Rx side processing on XR device includes also asynchronous time wrapping (ATW) for last moment image alignment with the latest pose information.

In some instances, another XR split approach may assume processing offloading with tethering to a relatively close companion device (e.g. UE) or processing split between XR device, companion UE and gNB. From the XR device perspective, the XR split approach may assume a similar processing load and locally covered functionality on the XR device side but with a local short range communication link with the associated companion device (e.g., UE) via 5G NR sidelink or Wi-Fi, for example, which allows to reduce modem related power consumption.

In some instances of the XR split approach, the XR device (e.g., googles, glasses, etc.) may function as a nearly input/output (I/O) device, such that the XR device transmit (TX) and receive (RX) complexity may be shifted or moved to the companion device (e.g., UE) as much as possible. This target is followed across the functional components of XR device including PHY/modem related complexity.

Figure 5:
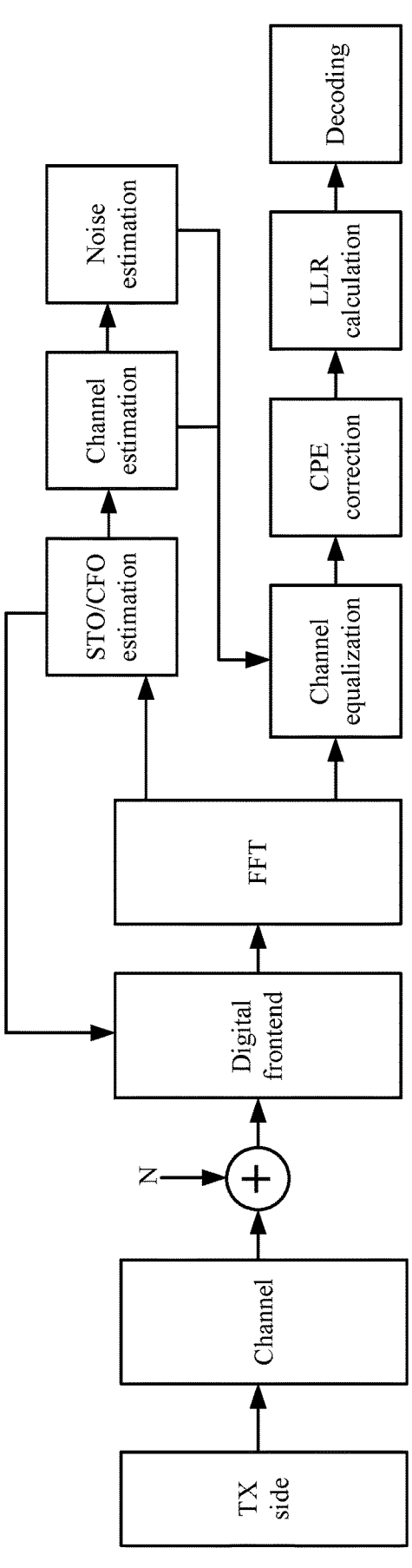
FIG. 5 is a diagram illustrating an example of a PHY receive architecture.
Figures 6A, 6B:
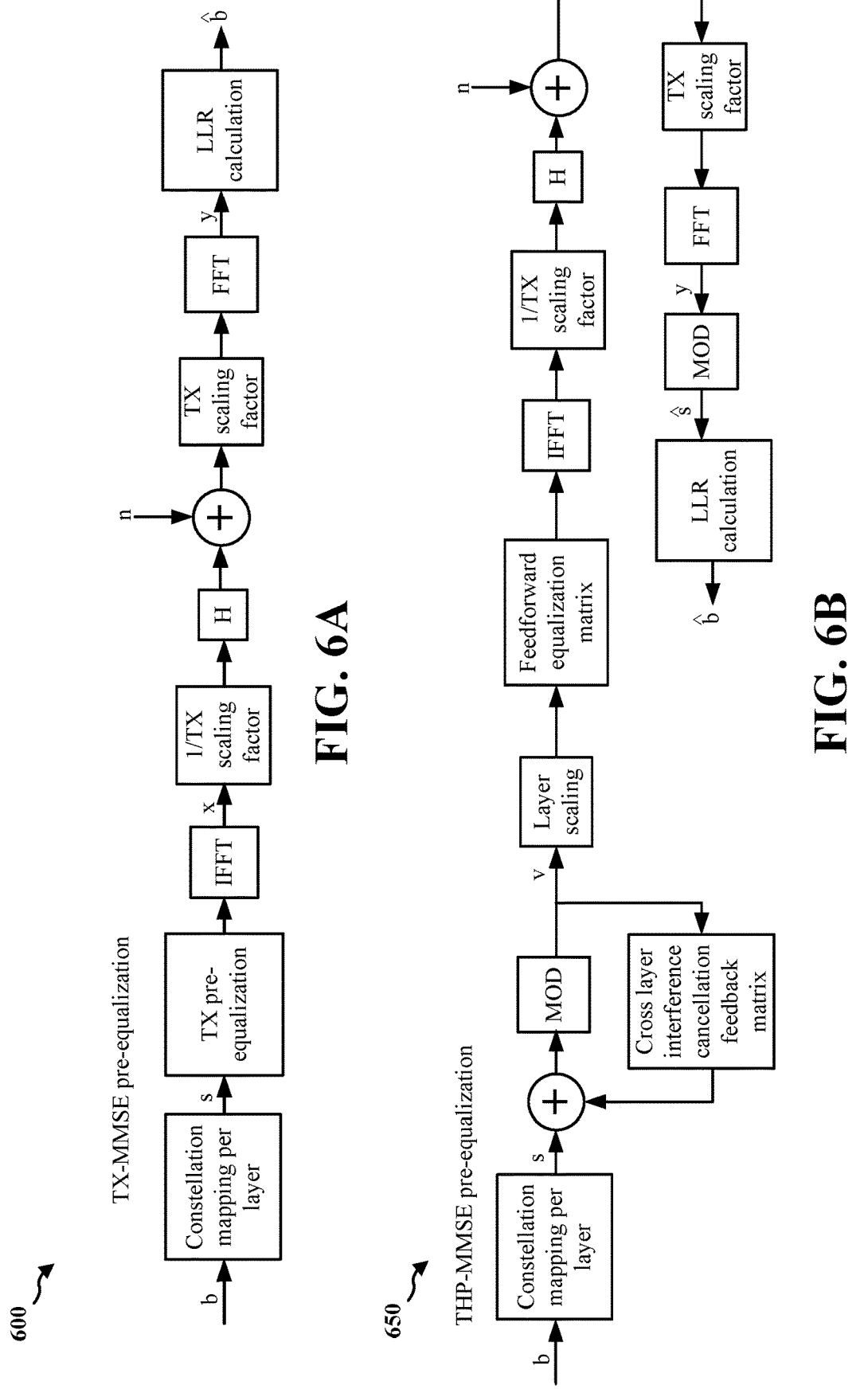
FIG. 6A is a diagram illustrating an example of a transmit pre-equalization scheme.
FIG. 6B is a diagram illustrating another example of a transmit pre-equalization scheme.

Most of the modem complexity may be typically associated with receive side processing at the XR device. For example, diagram 500 of FIG. 5 illustrates an example of a PHY receive architecture. Multiple receive PHY modules can be effectively shifted to the transmit side of the link from the XR receive side up to the point where a reduced processing is performed on the XR side to achieve a reduction in the receive modem complexity and power consumption reduction. Continuous uplink and downlink channels having a low latency TDD pattern, single frequency full duplex (SFFD) or sub-band full duplex (SBFD)/FDD, are assumed to allow a new PHY approach where most of the receive broadband processing related complexity is shifted to transmit side for dramatic XR device complexity and power consumption reduction. In some instances, the companion device (e.g., UE) may perform CFO/STO estimation and synchronization loop management for the XR device with correction updates indicated by the companion device to the paired XR device. In some instances, the channel estimation may be performed by the companion device with reciprocal channels (e.g., full duplex/TDD) or may be distributed between receive and transmit side for non-reciprocal channels (e.g., FDD/SBFD) with channel sampling occurring at the XR device and indicated to the companion device. In some aspects, the noise estimation may be indicated to the companion device in instances of channel reciprocity or may be evaluated by the companion device. In some instances, the FFT complexity may be reduced in instances where DFT-S-OFDM waveform is used. For example, data symbol processing on the receive side via TD if FFT and DFT are the same size and no other XR users are multiplexed in FD on the same CC/UWB subchannel. In another example, the receive side channel sampling may be performed directly in TD. In some instances, the companion device may perform channel equalization or log-likelihood ratio (LLR) scaling based on a dedicated pre-equalized RS. FIGS. 6A and 6B provide example diagrams 600, 650 of block diagrams of transmit pre-equalization schemes. The diagram 600 is an example of a transmit minimum mean squared error (TX-MMSE) pre-equalization. The diagram 650 is an example of a Tomlinson-Harashima precoding (THP) MMSE pre-equalization. For THP MMSE enhanced LLR calculation may be used and may include cyclic soft symbol expansion hypothesis testing to mitigate modulo related loss.

Aspects presented herein provide a configuration for downlink control data to support transmit equalization based on waveforms. For example, the downlink control data may be configured to enable or support a low complexity, low power, high bit rate sidelink over UWB frequency ranges. At least one advantage of the disclosure is that the downlink control data may consider different UWB specific aspects and waveform specifics required to enable low complexity and high spectral efficiency/bit rate link. At least another advantage of the disclosure is to enable a shift of at least a portion of the XR processing to a separate companion device. This approach may alleviate some of the burdens on the XR device. The approach offloads processing, such as rendering-related processing or equalization (e.g., which may be referred to as pre-equalization as it is performed prior to transmission to the XR device), to a companion device. The processing performed by the companion device can help to reduce the power consumption at the XR device while maintaining video quality or user experience, for example. FIG. 4B is a diagram 400 illustrating an example scenario for XR traffic in which an XR device (which may be, for example, augmented reality (AR) glasses or other types of XR devices) transmits and receives XR traffic with a service at a cloud server 418 via a wireless network that the XR device accesses via a companion device (e.g., UE 412). For example, the XR device transmits XR traffic to the UE, which in turn transmits the XR traffic to the network. XR traffic provided from the cloud server, e.g., such as video, graphics, or other XR traffic, are transmitted via the wireless network to the companion device (e.g., 402) that then transmits the XR traffic to the XR device 401. In FIG. 4B, at least some processing of the XR device 401 may be offloaded to various components connected with it, such as the UE 412 (which may be referred to as a companion device), base station 414, and/or a cloud server 418. For example, the UE 412 may perform pre-equalization on transmissions of XR traffic before providing the transmission to the XR device 401. This enables the XR device to receive the XR traffic without performing receiver side equalization.

In some aspects, the control channel may be configured to be at the beginning of every TX pre-equalization refresh period where the TX equalization matrix is updated using a refreshed CSI. The control data may be configured to support the TX equalization scheme, as shown for example in FIGS. 6A and 6B, and may be conveyed once for every CSI/equalization refresh period as the TX scaling, and correspondingly RX scaling coefficients and/or LLR scaling coefficients may be updated every time the TX equalization matrix is changed.

In some aspects, the control channel may be comprised of a sidelink control information (SCI) first part and a SCI second part. The SCI first part may comprise basic, regular, and/or critical control information (e.g., scheduling control and parameters that are required to decode SCI second part) will be sent on SCI first part. The SCI second part may comprise higher volume control information such as TX-scaling and LLR-scaling coefficients, which may assist to achieve the processing complexity reduction on the XR device side. The higher volume control information may be sent on SCI second part with the same waveform as the data. According to the proposed XR processing scheme, there are no equalization and channel estimation procedures done on the XR side for the data channel. So, for SCI second part, TX-side equalization (e.g., same pre-equalization matrix that is used for the data) may be applied as well to minimize SCI second part processing, hardware complexity, power consumption, and control data capacity overhead. In some instances, as a part of the TX equalization scheme for UWB based sidelink, TX scaling factor per 1 Mhz (or a smaller bandwidth portion) should be applied also on SCI second part for an average equivalent isotropic radiated power (EIRP) (EIRP_avg@1 ms=−41dbm@1 Mhz) for UWB band. In some instances, LLR scaling RS may be allocated over SCI second part to allow low complexity calculation of LLR scaling coefficients for TX equalized control data. In some aspects, the SCI second part may use a lower MCS, code rate, or modulation order compared to the data and may be on a separate transport block.

Figure 7:
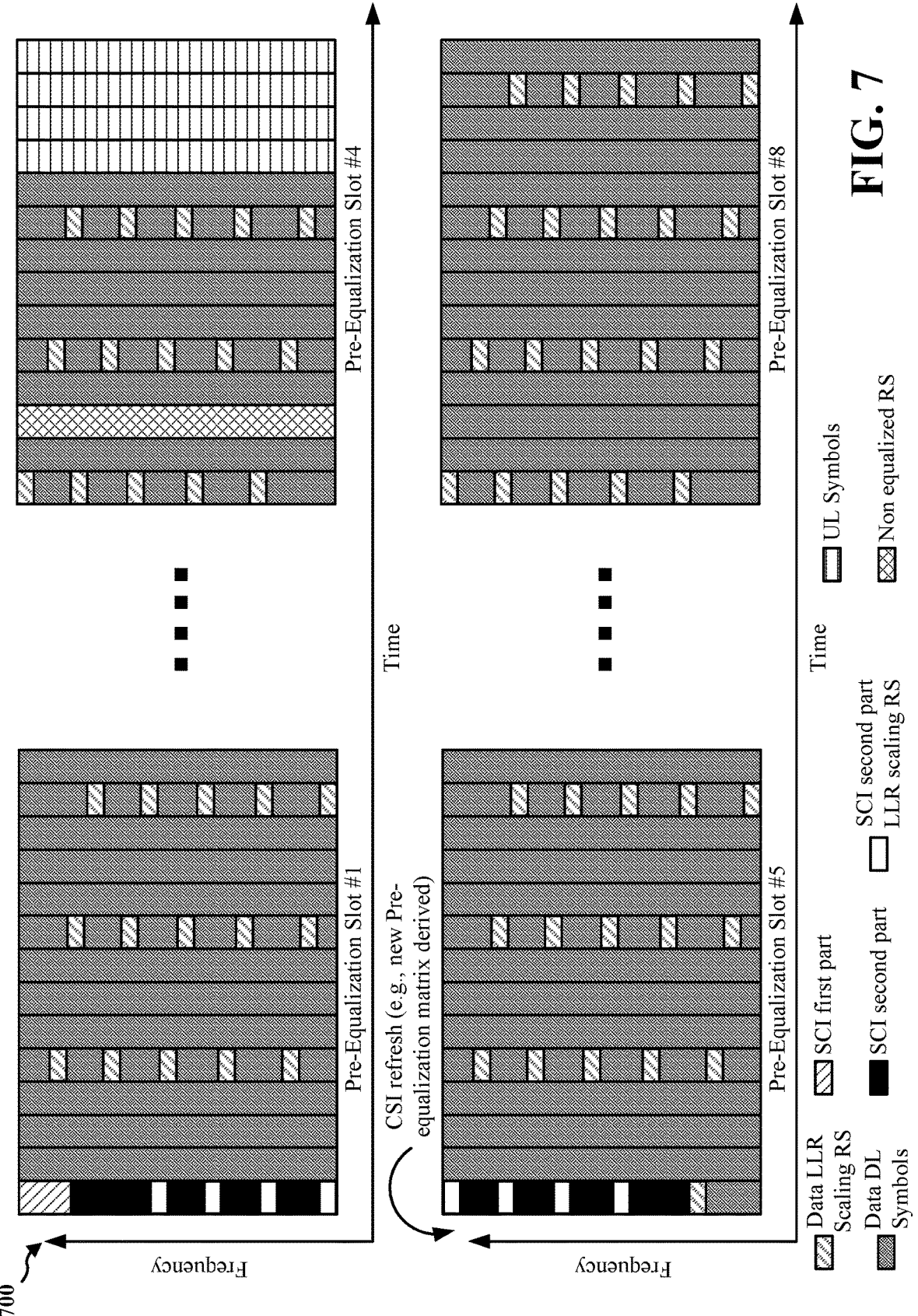
FIG. 7 is a diagram illustrating an example of a downlink control channel.

FIG. 7 illustrates an example diagram 700 of the downlink control channel. In the diagram 700 of FIG. 7 comprises a jumbo packet structure of 8 slots with TX equalization refresh occurring once per every 4 slots. However, the disclosure is not intended to be limited to the aspects disclosed herein, such that the downlink control channel may utilize a packet structure having more or less than 8 slots with TX equalization refresh occurring at different slot rates. In the example of diagram 700 of FIG. 7, the control channel comprising CSI first part and CSI second part occupies the entire first OFDM symbol of the first slot of TX pre-equalized data allocation/transmission and a part of the first OFDM symbol (CSI second part) of the fifth slot which is the first slot after pre-equalization matrix refresh. The SCI first part may be signaled once per jumbo packet (e.g., in the case of every 8 slots) and carries scheduling information and regular allocation parameters for the entire jumbo packet. The SCI second part may be at the beginning of each allocation and also once per CSI refresh period on the first OFDM symbol after CSI refresh, which occurs in every 4 slots of the example of FIG. 7. For the diagram 700 of FIG. 7, the CSI refresh at the UE side which takes place before the fifth slot may be based on reciprocity or based on a sampling of an un-equalized DL RS signaled from the RX to TX side (not shown in the illustration). In some aspects, to perform the CSI refresh, a non-equalized RS may be allocated in instances of no reciprocity, as well as an allocation of uplink symbols to allow the XR device to send the indication back to the companion device, as shown for example in pre-equalization slot #4 of diagram 700 of FIG. 7.

Figure 8:
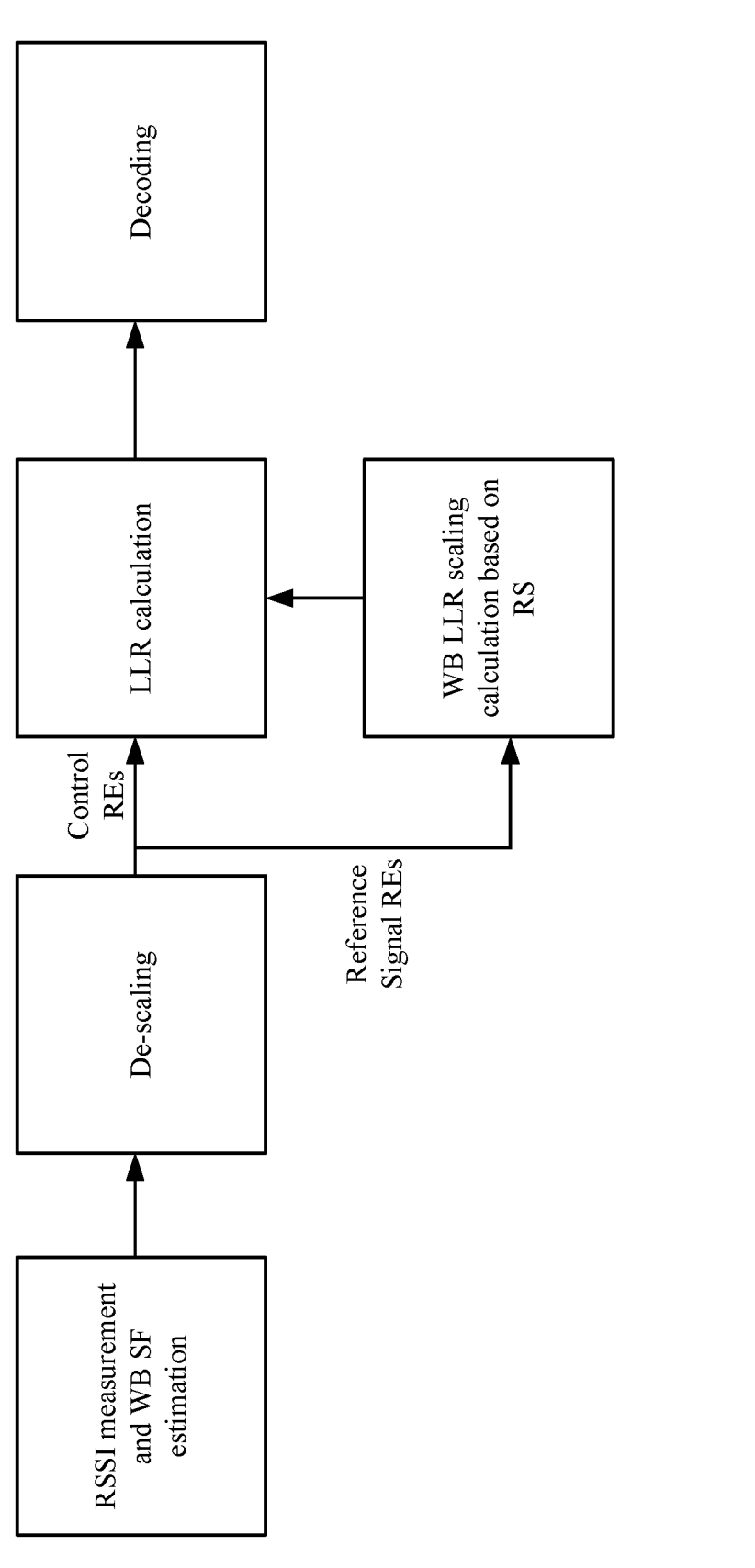
FIG. 8 is a diagram illustrating an example of data processing at an XR device.

FIG. 8 illustrates an example diagram 800 of SCI second part processing at the XR device. For successful decoding of pre-equalized transmission at the XR side, the knowledge of the applied per 1 Mhz or smaller BW portion TX scaling coefficients along with LLR scaling coefficients (e.g., in instances where LLR scaling RS is not used) should be present at the XR side. However, as the SCI second part is the container that will be used to convey these coefficients, and SCI second part reception may rely on TX equalization same as for the data, TX scaling factors corresponding to SCI second part occupied bandwidth are unknown at the time of this control data reception/decoding. For the RX processing of the SCI second part data, the RX scaling may be assumed over the occupied by SCI second part bandwidth and may be estimated based on the received signal strength indicator (RSSI). LLR scaling for SCI second part REs may also be wideband (WB) and may be evaluated similarly to data based on LLR scaling RS comprised within SCI second part resources. In instances of a poor/high error vector magnitude (EVM) for the control channel due to mismatches in TX scaling factor (e.g., narrowband TX scaling and WB RX scaling) and WB LLR scaling estimation, more robust RX scaling mismatches TX MMSE pre-equalization may be used for control REs even if the data is THP-MMSE pre-equalized, where THP MMSE may perform better for mid/high SNR instances while TS MMSE performs better for low SNR instances. In some aspects, for low MCS (as targeted for the control channel) with QPSK/BPSK limited constellation and TX-MMSE type of TX equalization, the SCI second part data may be demodulated with WB RX scaling without any performance penalty. In instances where the TX equalization method for control REs is TX-MMSE, the processing scheme suggested for Tx MMSE equalized data may be re-used for control REs/channel (e.g., up to Rx scaling and LLR scaling which will be WB for control REs). In some aspects, the SCI second part may not be utilized since it comes relatively close to the DL RS used for CSI refresh (e.g., low phase offset accumulation) and the SCI second part uses low MCS making it more robust.

As discussed above, the SCI second part is not needed for data transmission with MCS_idx<THR under TX MMSE based equalization as the same performance can be achieved without any knowledge of the TX side scaling. In some aspects, the SCI second part may be needed for THP MMSE based TX pre-equalization or for MCS_idx>THR. As such, based on the indicated TX/RX equalization option, TX pre-equalization method (e.g., TX MMSE, THP MMSE) and DL MCS, conveyed via SCI first part 1, RX side can determine if the SCI second part is present or not. In instances where the SCI second part is present, the SCI second part may convey the extra control data to support TX equalization based scheme if the SCI first part indicates that the TX equalization is applied (e.g., TX/RX equalization indication).

Due to a relatively high volume of control data required to support the TX equalization-based scheme, the control data can be conveyed reusing SCI second part concept with the following additions, modifications, or restrictions. For example, a different MCS from what is used for data REs may be fixed or dynamically indicated via SCI first part low MCS restricted to QPSK modulation order or MCS calculated based on a pre-defined delta from the MCS used for data REs, still with restriction to QPSK modulation order: MCS_SCI_part_2=min (max_MCS_QPSK, MCS_idx=MCS_data-delta)). In some aspects, TX equalization restricted to linear equalization (e.g., TX MMSE) for control REs (e.g., SCI second part) due to sensitivity of nonlinear TX equalization (e.g., THP MMSE) to a non-accurate RX scaling per RE (WB Rx scaling does not follow per 1 Mhz/per RE Tx scaling to be reverted/compensated). Correspondingly, a different TX equalization may be used for SCI second part REs (e.g., Tx MMSE) and data REs (e.g., THP MMSE). In some aspects, RX equalization for control channel may be assumed, also for SCI second part in addition to SCI part 1. In such instances, control REs can be transmitted with or without TX equalization applied on them and accompanied with a dedicated DMRS on the REs range spanned by SCI first part and SCI second part allocation allowing to run a full RX demodulation scheme for control channel including channel and Rnn estimation and RX equalization. In some aspects, the SCI second part payload size may be predefined by the data allocation BW (e.g., no need to signal its size). The TX scaling and correspondingly RX de-scaling granularity (e.g., per 1 Mhz or less BW fraction) may be preconfigured or pre-defined and the number of bits per scaling coefficient may also be predefined or preconfigured. As such, the SCI second part payload size can be calculated based on the following:

Num_Rx_scaling_coeffs*Num_bits_per_cocf,
Num_Rx_scaling_coeffs=BW/Tx_scaling_resolution.

In some aspects, the SCI first part and the SCI second part may span one or more OFDM symbols and may occupy a fraction of the full bandwidth on its first or its last OFDM symbol. The SCI first part may be allocated first in frequency and the SCI second part may start immediately after the SCI first part. In some aspects, the 1 MHz/narrowband RX scaling factors indicated by the SCI second part payload may be used for data REs RX scaling as a first step of data REs processing when the TX equalization is employed. In instances that any non-accounted by TX equalization RX automatic gain control (AGC) gain or any other WB scaling was applied on the RX side on data symbols/REs prior to per 1 Mhz/NB Rx scaling step, then per 1 Mhz scaling should be adjusted to take in account any already applied WB RX scaling as follows: Per_1Mhz_Rx_scale_adjusted=Per_1Mhz_Rx_scale/WB_ scale.

Figure 9:
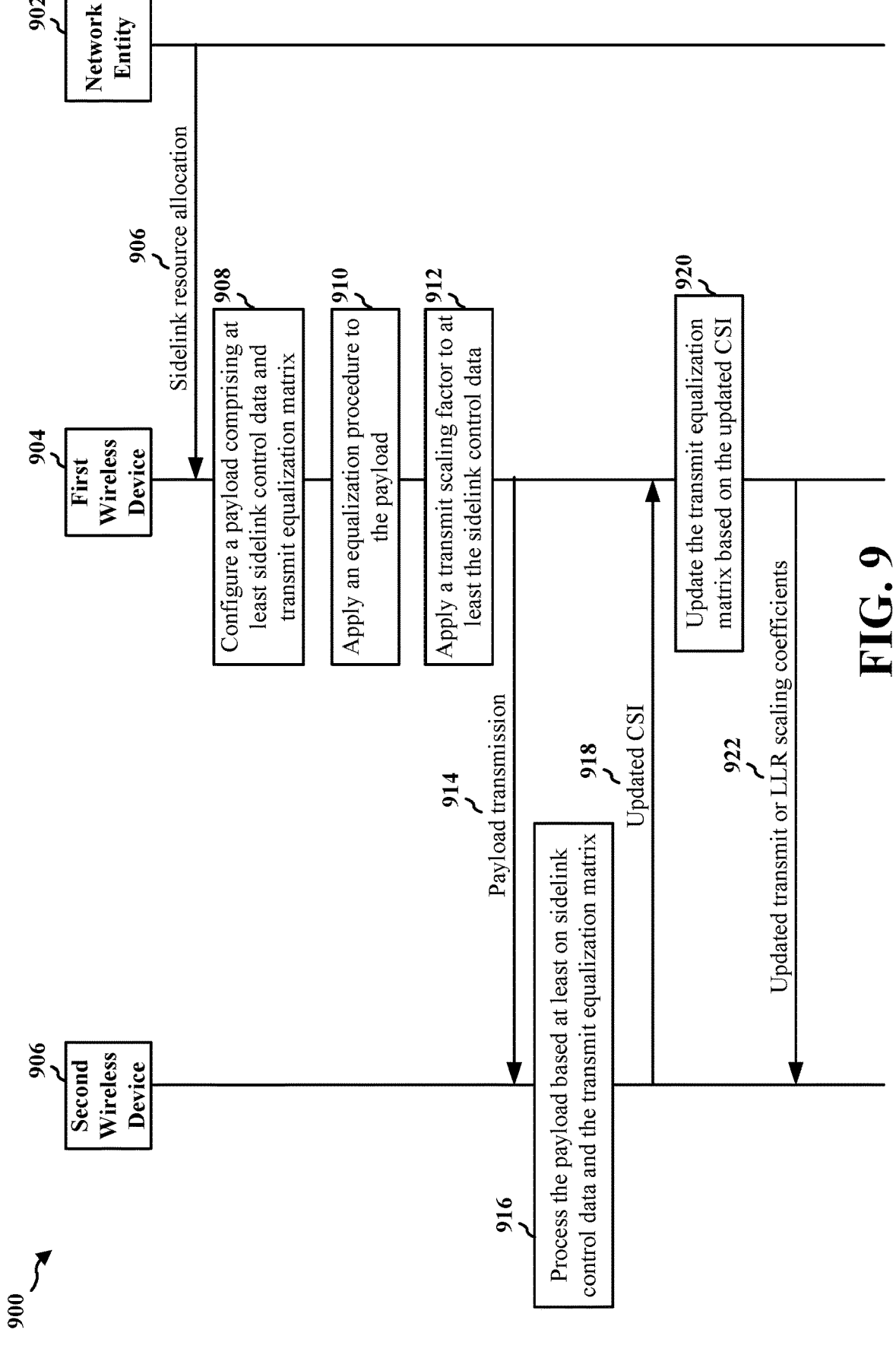
FIG. 9 is a call flow diagram of signaling between a first wireless device and a second wireless device.

FIG. 9 is a call flow diagram 900 of signaling between a network entity 902, a first wireless device 904, and a second wireless device 906. The network entity 902 may be configured to provide at least one cell. The first wireless device 904 or the second wireless device 906 may be configured to communicate with each other or with the network entity 902. For example, in the context of FIG. 1, the network entity 902 may correspond to base station 102 and the first wireless device 904 or the second wireless device 906 may correspond to at least UE 104. In another example, in the context of FIG. 3, the network entity 902 may correspond to base station 310 and the first wireless device 904 or the second wireless device 906 may correspond to UE 350. In some aspects, the second wireless device 906 may comprise an XR device (e.g., goggles, headset) or a UE, where the first wireless device 904 may comprise a UE or a network entity, such that the XR device (e.g., second wireless device) may communicate with the UE/network entity (e.g., first wireless device).

At 906, the network entity 902, in some aspects, may provide an allocation of sidelink resources to the first wireless device 904. The first wireless device may receive the allocation of sidelink resources from the network entity 902. The first wireless device may utilize the allocation of sidelink resources to communicate with the second wireless device 906. In some aspects, the first wireless device 904 may utilize sidelink resources to communicate with the second wireless device 906 without the explicit allocation of sidelink resources from the network entity 902.

At 908, the first wireless device 908 may configure a payload comprising at least sidelink control data and a transmit equalization matrix for transmission within a transmit pre-equalization refresh period. The sidelink control data may comprise at least one of a first part or a second part. In some aspects, the sidelink control data may comprise only the first part, while in some aspects, the sidelink control data may comprise the first part and the second part. In some aspects, the first part of the sidelink control data may at least comprise scheduling control and parameters to decode the second part of the sidelink control data. In some aspects, the second part of the sidelink control data may at least comprise transmit scaling coefficients or LLR scaling coefficients. The second part of the sidelink control data may be configured to comprise one or more of a reduced MCS, a code rate, or a modulation order that is less than a remaining data within the payload.

At 910, the first wireless device 904 may apply an equalization procedure to the payload, as shown in connection with any of FIGS. 5-8. The first wireless device may apply the equalization procedure to the payload based at least on the transmit equalization matrix.

At 912, the first wireless device 904 may apply a transmit scaling factor to the payload, as shown in connection with any of FIGS. 5-8. In some aspects, the first wireless device may apply the transmit scaling factor to at least the sidelink control data of the payload.

At 914, the first wireless device 904 may transmit the payload comprising at least the sidelink control data and the transmit equalization matrix, as shown in connection with any of FIGS. 5-8. The first wireless device may transmit the payload comprising at least the sidelink control data and the transmit equalization matrix to the second wireless device 906. The second wireless device 906 may receive the payload comprising at least the sidelink control data and the transmit equalization matrix from the first wireless device 904. In some aspects, the second part of the sidelink control data is transmitted on a separate transport block than the remaining data within the payload.

At 916, the second wireless device 906 may process the payload, as shown in connection with any of FIGS. 5-8. For example, 1404 may be performed by payload component 198 of apparatus 1604. The second wireless device may process the payload based at least on the sidelink control data and the transmit equalization matrix.

At 918, the second wireless device 906 may transmit an updated CSI. The second wireless device may transmit the updated CSI to the first wireless device 904. The first wireless device 904 may receive the updated CSI from the second wireless device 906, as shown in connection with any of FIGS. 5-8.

At 920, the first wireless device 906 may update the transmit equalization matrix. The first wireless device may update the transmit equalization matrix based on an updated CSI received from the second wireless device, as shown in connection with any of FIGS. 5-8.

At 922, the first wireless device may transmit updated transmit scaling coefficients or updated LLR scaling coefficients of the second part of the sidelink control data. The first wireless device may transmit the updated transmit scaling coefficients or the updated LLR scaling coefficients of the second part of the sidelink control data in response to receipt of an update to the transmit equalization matrix from the second wireless device 906. The second wireless device 906 may receive the the updated transmit scaling coefficients or the updated LLR scaling coefficients of the second part of the sidelink control data from the first wireless device 904.

FIG. 10 is a flowchart 1000 of a method of wireless communication at a first wireless device. The method may be performed by a UE (e.g., the UE 104; the apparatus 1204 or may be performed by a network entity (e.g., the base station 102; the network entity 1202, 1302). One or more of the illustrated operations may be omitted, transposed, or contemporaneous. The method may allow for a downlink control data to support transmit equalization based waveforms.

At 1002, the first wireless device may configure a payload comprising at least sidelink control data and a transmit equalization matrix. For example, 1002 may be performed by payload component 199 of apparatus 1204 or network entity 1302. The payload comprising at least the sidelink control data and the transmit equalization matrix may be for transmission within a transmit pre-equalization refresh period. The sidelink control data may comprise at least one of a first part or a second part. In some aspects, the sidelink control data may comprise only the first part, while in some aspects, the sidelink control data may comprise the first part and the second part. In some aspects, the first part of the sidelink control data may at least comprise scheduling control and parameters to decode the second part of the sidelink control data. In some aspects, the second part of the sidelink control data may at least comprise transmit scaling coefficients or LLR scaling coefficients. The second part of the sidelink control data may be configured to comprise one or more of a reduced MCS, a code rate, or a modulation order that is less than a remaining data within the payload.

At 1004, the first wireless device may apply an equalization procedure to the payload. For example, 1004 may be performed by payload component 199 of apparatus 1204 or network entity 1302. The first wireless device may apply the equalization procedure to the payload based at least on the transmit equalization matrix.

At 1006, the first wireless device may transmit the payload comprising at least the sidelink control data and the transmit equalization matrix. For example, 1006 may be performed by payload component 199 of apparatus 1204 or network entity 1302. The first wireless device may transmit the payload comprising at least the sidelink control data and the transmit equalization matrix to a second wireless device. In some aspects, the second part of the sidelink control data is transmitted on a separate transport block than the remaining data within the payload.

FIG. 11 is a flowchart 1100 of a method of wireless communication at a first wireless device. The method may be performed by a UE (e.g., the UE 104; the apparatus 1204 or may be performed by a network entity (e.g., the base station 102; the network entity 1202, 1302). One or more of the illustrated operations may be omitted, transposed, or contemporaneous. The method may allow for a downlink control data to support transmit equalization based waveforms.

At 1102, the first wireless device may configure a payload comprising at least sidelink control data and a transmit equalization matrix. For example, 1002 may be performed by payload component 199 of apparatus 1204 or network entity 1302. The payload comprising at least the sidelink control data and the transmit equalization matrix may be for transmission within a transmit pre-equalization refresh period. The sidelink control data may comprise at least one of a first part or a second part. In some aspects, the sidelink control data may only comprise the first part, while in some aspects, the sidelink control data may comprise the first part and the second part. In some aspects, the first part of the sidelink control data may at least comprise scheduling control and parameters to decode the second part of the sidelink control data. In some aspects, the second part of the sidelink control data may at least comprise transmit scaling coefficients or LLR scaling coefficients. The second part of the sidelink control data may be configured to comprise one or more of a reduced MCS, a code rate, or a modulation order that is less than a remaining data within the payload.

At 1104, the first wireless device may apply an equalization procedure to the payload. For example, 1004 may be performed by payload component 199 of apparatus 1204 or network entity 1302. The first wireless device may apply the equalization procedure to the payload based at least on the transmit equalization matrix.

At 1106, the first wireless device may apply a transmit scaling factor to the payload. For example, 1106 may be performed by payload component 199 of apparatus 1204 or network entity 1302. In some aspects, the first wireless device may apply the transmit scaling factor to at least the sidelink control data of the payload.

At 1108, the first wireless device may transmit the payload comprising at least the sidelink control data and the transmit equalization matrix. For example, 1108 may be performed by payload component 199 of apparatus 1204 or network entity 1302. The first wireless device may transmit the payload comprising at least the sidelink control data and the transmit equalization matrix to a second wireless device. In some aspects, the second part of the sidelink control data is transmitted on a separate transport block than the remaining data within the payload.

At 1110, the first wireless device may update the transmit equalization matrix. For example, 1110 may be performed by payload component 199 of apparatus 1204 or network entity 1302. The first wireless device may update the transmit equalization matrix based on an updated CSI received from the second wireless device.

At 1112, the first wireless device may transmit updated transmit scaling coefficients or updated LLR scaling coefficients of the second part of the sidelink control data. For example, 1112 may be performed by payload component 199 of apparatus 1204 or network entity 1302. The first wireless device may transmit the updated transmit scaling coefficients or the updated LLR scaling coefficients of the second part of the sidelink control data in response to receipt of an update to the transmit equalization matrix from the second wireless device.

Figure 12:
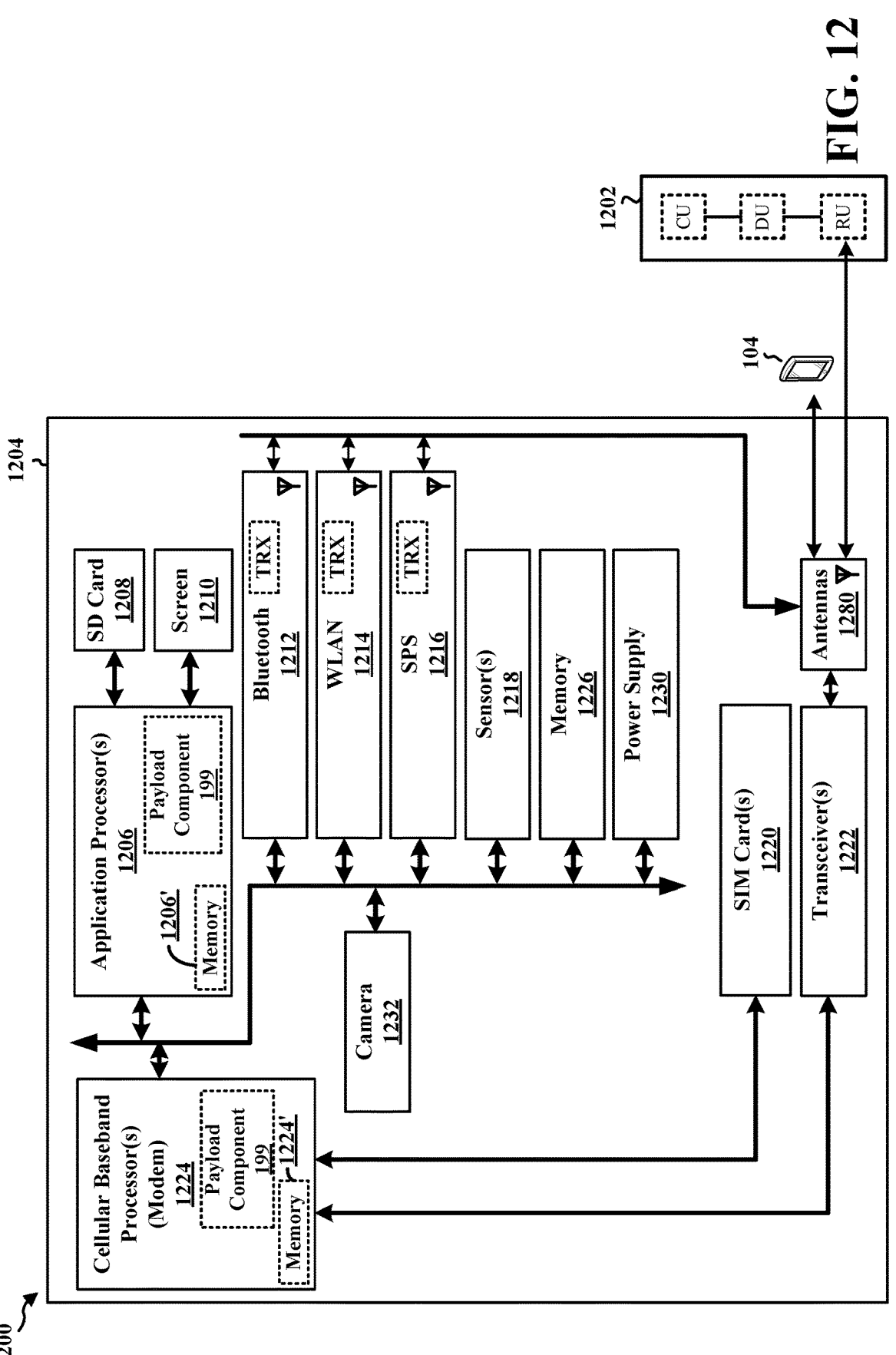
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The cellular baseband processor(s) 1224 and the application processor(s) 1206 are configured to perform the various functions described supra based at least in part of the information stored in the memory. That is, the cellular baseband processor(s) 1224 and the application processor(s) 1206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1224/application processor(s) 1206 when executing software. The cellular baseband processor (s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., sec UE 350 of FIG. 3) and include the additional modules of the apparatus 1204.

Figure 13:
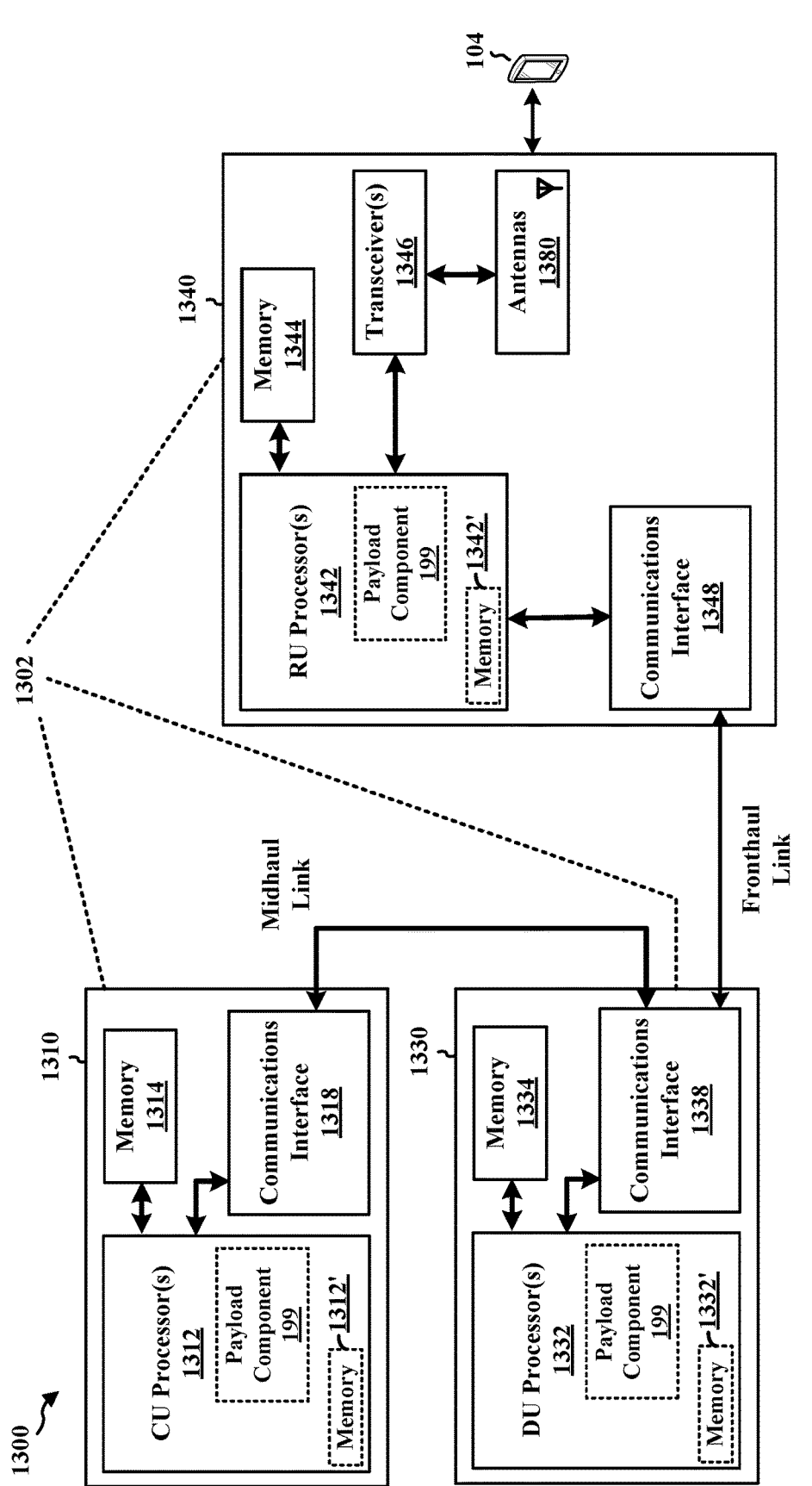
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor 1312. The CU processor(s) 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include at least one DU processor 1332. The DU processor(s) 1332 may include on-chip memory 1332'. In some aspects, the DU 1330 may further include additional memory modules 1334 and a communications interface 1338. The DU 1330 communicates with the RU 1340 through a fronthaul link. The RU 1340 may include at least one RU processor 1342. The RU processor(s) 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/ memory may also be used for storing data that is manipulated by the processor(s) when executing software.

As discussed supra, the component 199 may be configured to configure a payload comprising at least sidelink control data and a transmit equalization matrix for transmission within a transmit pre-equalization refresh period, wherein the sidelink control data comprising at least one of a first part or a second part; apply an equalization procedure to the payload based at least on the transmit equalization matrix; and transmit, to a second wireless device, the payload comprising at least the sidelink control data and the transmit equalization matrix. In some aspects, the component 199 may be within the cellular baseband processor(s) 1224, the application processor(s) 1206, or both the cellular baseband processor(s) 1224 and the application processor(s) 1206. In some aspects, the component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) 1224 and/or the application processor(s) 1206, may include means for configuring a payload comprising at least sidelink control data and a transmit equalization matrix for transmission within a transmit pre-equalization refresh period. The sidelink control data comprising at least one of a first part or a second part. The apparatus includes means for applying an equalization procedure to the payload based at least on the transmit equalization matrix. The apparatus includes means for transmitting, to a second wireless device, the payload comprising at least the sidelink control data and the transmit equalization matrix. The apparatus further includes means for updating the transmit equalization matrix based on an updated CSI received from the second wireless device. The apparatus further includes means for transmitting updated transmit scaling coefficients or LLR scaling coefficients of the second part of the sidelink control data in response to an update to the transmit equalization matrix. The apparatus further includes means for applying a transmit scaling factor to at least the sidelink control data. The means may be the component 199 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

The network entity 1302 may include a variety of components configured for various functions. In one configuration, the network entity 1302 may include means for configuring a payload comprising at least sidelink control data and a transmit equalization matrix for transmission within a transmit pre-equalization refresh period. The sidelink control data comprising at least one of a first part or a second part. The apparatus includes means for applying an equalization procedure to the payload based at least on the transmit equalization matrix. The apparatus includes means for transmitting, to a second wireless device, the payload comprising at least the sidelink control data and the transmit equalization matrix. The apparatus further includes means for updating the transmit equalization matrix based on an updated CSI received from the second wireless device. The apparatus further includes means for transmitting updated transmit scaling coefficients or LLR scaling coefficients of the second part of the sidelink control data in response to an update to the transmit equalization matrix. The apparatus further includes means for applying a transmit scaling factor to at least the sidelink control data. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

FIG. 14 is a flowchart 1400 of a method of wireless communication at a second wireless device. The method may be performed by a UE (e.g., the UE 104; the apparatus 1604) or may be performed by an XR device (e.g., 401, the apparatus 1604). One or more of the illustrated operations may be omitted, transposed, or contemporaneous. The method may allow for a downlink control data to support transmit equalization based waveforms.

At 1402, the second wireless device may receive a payload. For example, 1402 may be performed by payload component 198 of apparatus 1604. The second wireless device may receive the payload from a first wireless device. The payload may comprise at least sidelink control data and a transmit equalization matrix. The sidelink control data may comprise at least one of a first part or a second part. In some aspects, the sidelink control data may only comprise the first part, while in some aspects, the sidelink control data may comprise the first part and the second part. In some aspects, the first part of the sidelink control data may at least comprise scheduling control and parameters to decode the second part of the sidelink control data. In some aspects, the second part of the sidelink control data may at least comprise transmit scaling coefficients or LLR scaling coefficients. The second part of the sidelink control data may be configured to comprise one or more of a reduced MCS, a code rate, or a modulation order that is less than a remaining data within the payload. In some aspects, the second part of the sidelink control data may be transmitted, by the first wireless device, on a separate transport block than the remaining data within the payload. In some aspects, the sidelink control data may comprise the first part and the second part, where the second part may comprise information related to an equalization procedure applied at the first wireless device. For example, the first part may indicate that the equalization procedure has been applied to the payload at the first wireless device.

At 1404, the second wireless device may process the payload. For example, 1404 may be performed by payload component 198 of apparatus 1604. The second wireless device may process the payload based at least on the sidelink control data and the transmit equalization matrix.

FIG. 15 is a flowchart 1500 of a method of wireless communication at a second wireless device. The method may be performed by a UE (e.g., the UE 104; the apparatus 1604) or may be performed by an XR device (e.g., 401, the apparatus 1604). One or more of the illustrated operations may be omitted, transposed, or contemporaneous. The method may allow for a downlink control data to support transmit equalization based waveforms.

At 1502, the second wireless device may receive a payload. For example, 1502 may be performed by payload component 198 of apparatus 1604. The second wireless device may receive the payload from a first wireless device. The payload may comprise at least sidelink control data and a transmit equalization matrix. The sidelink control data may comprise at least one of a first part or a second part. In some aspects, the sidelink control data may only comprise the first part, while in some aspects, the sidelink control data may comprise the first part and the second part. In some aspects, the first part of the sidelink control data may at least comprise scheduling control and parameters to decode the second part of the sidelink control data. In some aspects, the second part of the sidelink control data may at least comprise transmit scaling coefficients or LLR scaling coefficients. The second part of the sidelink control data may be configured to comprise one or more of a reduced MCS, a code rate, or a modulation order that is less than a remaining data within the payload. In some aspects, the second part of the sidelink control data may be transmitted, by the first wireless device, on a separate transport block than the remaining data within the payload. In some aspects, the sidelink control data may comprise the first part and the second part, where the second part may comprise information related to an equalization procedure applied at the first wireless device. For example, the first part may indicate that the equalization procedure has been applied to the payload at the first wireless device.

At 1504, the second wireless device may process the payload. For example, 1504 may be performed by payload component 198 of apparatus 1604. The second wireless device may process the payload based at least on the sidelink control data and the transmit equalization matrix.

At 1506, the second wireless device may transmit an updated CSI. For example, 1506 may be performed by payload component 198 of apparatus 1604. The second wireless device may transmit the updated CSI to the first wireless device.

At 1508, the second wireless device may receive updated transmit scaling coefficients or LLR scaling coefficients. For example, 1508 may be performed by payload component 198 of apparatus 1604. The second wireless device may receive the updated transmit scaling coefficients or the updated LLR scaling coefficients from the first wireless device. The second wireless device may receive the updated transmit scaling coefficients or the updated LLR scaling coefficients from the first wireless device in response to transmission of the updated CSI.

Figure 16:
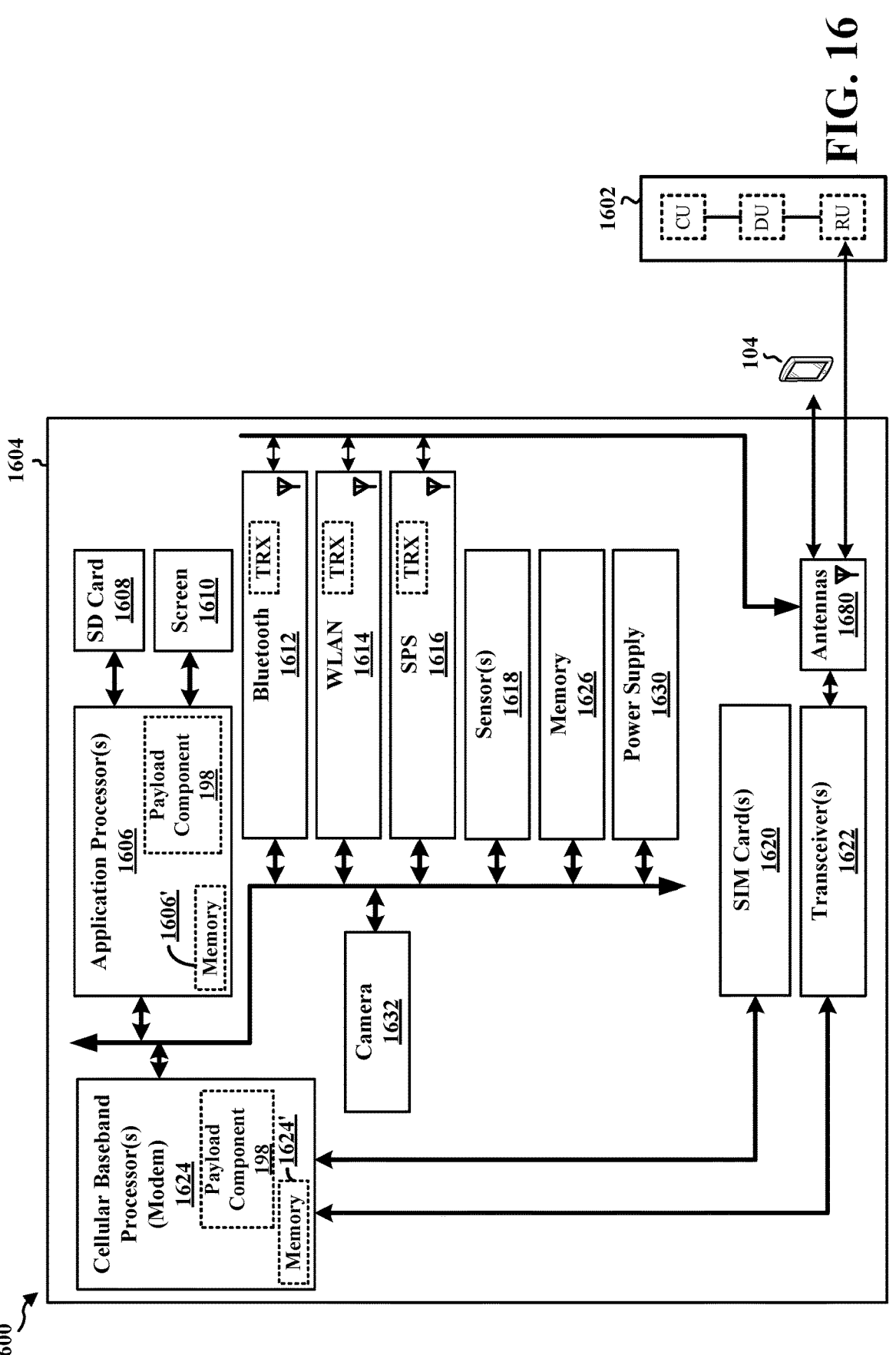
FIG. 16 is a diagram illustrating an example of a hardware implementation for an example apparatus.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include at least one cellular baseband processor 1624 (also referred to as a modem) coupled to one or more transceivers 1622 (e.g., cellular RF transceiver). The cellular baseband processor(s) 1624 may include at least one on-chip memory 1624'. In some aspects, the apparatus 1604 may further include one or more subscriber identity modules (SIM) cards 1620 and at least one application processor 1606 coupled to a secure digital (SD) card 1608 and a screen 1610. The application processor(s) 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor(s) 1624 communicates through the transceiver(s) 1622 via one or more antennas 1680 with the UE 104 and/or with an RU associated with a network entity 1602. The cellular baseband processor(s) 1624 and the application processor(s) 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor(s) 1624 and the application processor(s) 1606 are each responsible for general processing, including the execution of software stored on the computer-readable medium/memory. The software, when executed by the cellular baseband processor(s) 1624/application processor(s) 1606, causes the cellular baseband processor(s) 1624/application processor(s) 1606 to perform the various functions described supra. The cellular baseband processor(s) 1624 and the application processor(s) 1006 are configured to perform the various functions described supra based at least in part of the information stored in the memory. That is, the cellular baseband processor(s) 1624 and the application processor(s) 1606 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1624/application processor(s) 1606 when executing software. The cellular baseband processor(s) 1624/application processor(s) 1606 may be a component of the UE 350 and may include the at least one memory 360 and/or at least one of the TX processor 368, the RX processor 356, and the controller/processor 359. In one configuration, the apparatus 1604 may be at least one processor chip (modem and/or application) and include just the cellular baseband processor(s) 1624 and/or the application processor(s) 1606, and in another configuration, the apparatus 1604 may be the entire UE (e.g., sec UE 350 of FIG. 3) and include the additional modules of the apparatus 1604.

As discussed supra, the component 198 may be configured to receive, from a first wireless device, a payload comprising at least sidelink control data and a transmit equalization matrix, wherein the sidelink control data comprising at least one of a first part or a second part; and process the payload based at least on the sidelink control data and the transmit equalization matrix. The component 198 may be within the cellular baseband processor(s) 1624, the application processor(s) 1606, or both the cellular baseband processor(s) 1624 and the application processor(s) 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1604 may include a variety of components configured for various functions. In one configuration, the apparatus 1604, and in particular the cellular baseband processor(s) 1624 and/or the application processor(s) 1606, may include means for receiving, from a first wireless device, a payload comprising at least sidelink control data and a transmit equalization matrix. The sidelink control data comprising at least one of a first part or a second part. The apparatus includes means for processing the payload based at least on the sidelink control data and the transmit equalization matrix. The apparatus further includes means for transmitting, to the first wireless device, an updated CSI. The apparatus further includes means for receiving updated transmit scaling coefficients or LLR scaling coefficients in response to transmission of the update CSI. The means may be the component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device comprising configuring a payload comprising at least sidelink control data and a transmit equalization matrix for transmission within a transmit pre-equalization refresh period, wherein the sidelink control data comprising at least one of a first part or a second part; applying an equalization procedure to the payload based at least on the transmit equalization matrix; and transmitting, to a second wireless device, the payload comprising at least the sidelink control data and the transmit equalization matrix.

Aspect 2 is the method of aspect 1, further includes that the first part of the sidelink control data at least comprises scheduling control and parameters to decode the second part of the sidelink control data.

Aspect 3 is the method of any of aspects 1 and 2, further includes that the second part of the sidelink control data at least comprises transmit scaling coefficients or LLR scaling coefficients.

Aspect 4 is the method of any of aspects 1-3, further includes that the second part of the sidelink control data comprises a reduced MCS, a code rate, or a modulation order that is less than a remaining data within the payload.

Aspect 5 is the method of any of aspects 1-4, further includes that the second part of the sidelink control data is transmitted on a separate transport block than the remaining data within the payload.

Aspect 6 is the method of any of aspects 1-5, further including updating the transmit equalization matrix based on an updated CSI received from the second wireless device.

Aspect 7 is the method of any of aspects 1-6, further including transmitting updated transmit scaling coefficients or LLR scaling coefficients of the second part of the sidelink control data in response to an update to the transmit equalization matrix.

Aspect 8 is the method of any of aspects 1-7, further including applying a transmit scaling factor to at least the sidelink control data.

Aspect 9 is an apparatus for wireless communication at a first wireless device including at least one processor coupled to a memory and at least one transceiver, the at least one processor configured to implement any of aspects 1-8.

Aspect 10 is an apparatus for wireless communication at a first wireless device including means for implementing any of aspects 1-8.

Aspect 11 is a computer-readable medium storing computer executable code, where the code when executed by a processor causes the processor to implement any of aspects 1-8.

Aspect 12 is a method of wireless communication at a second wireless device comprising receiving, from a first wireless device, a payload comprising at least sidelink control data and a transmit equalization matrix, wherein the sidelink control data comprising at least one of a first part or a second part; and processing the payload based at least on the sidelink control data and the transmit equalization matrix.

Aspect 13 is the method of aspects 12, further includes that the first part of the sidelink control data at least comprises scheduling control and parameters to decode the second part of the sidelink control data.

Aspect 14 is the method of any of aspects 12 and 13, further includes that the second part of the sidelink control data at least comprises transmit scaling coefficients or LLR scaling coefficients.

Aspect 15 is the method of any of aspects 12-14, further includes that the second part of the sidelink control data comprises a reduced MCS, a code rate, or a modulation order that is less than a remaining data within the payload.

Aspect 16 is the method of any of aspects 12-15, further includes that the second part of the sidelink control data is transmitted on a separate transport block than the remaining data within the payload.

Aspect 17 is the method of any of aspects 12-16, further including transmitting, to the first wireless device, an updated CSI.

Aspect 18 is the method of any of aspects 12-17, further including receiving updated transmit scaling coefficients or LLR scaling coefficients in response to transmission of the update CSI.

Aspect 19 is the method of any of aspects 12-18, further includes that the sidelink control data comprises the first part and the second part, wherein the second part comprises information related to an equalization procedure applied at the first wireless device.

Aspect 20 is the method of any of aspects 12-19, further includes that the first part indicates that the equalization procedure was applied at the first wireless device.

Aspect 21 is an apparatus for wireless communication at a second network entity including at least one processor coupled to a memory and at least one transceiver, the at least one processor configured to implement any of aspects 12-20.

Aspect 22 is an apparatus for wireless communication at a second network entity including means for implementing any of aspects 12-20.

Aspect 23 is a computer-readable medium storing computer executable code, where the code when executed by a processor causes the processor to implement any of aspects 12-20.

What is claimed is:

1. An apparatus for wireless communication at a first wireless device, comprising:
   at least one memory; and
   at least one processor coupled to the at least one memory and, based at least in part on information stored in the at least one memory, the at least one processor, individually or in any combination, is configured to cause the apparatus to:
      configure a payload comprising at least sidelink control data and a transmit equalization matrix for transmission within a transmit pre-equalization refresh period, wherein the sidelink control data comprising at least one of a first part or a second part;
      apply an equalization procedure to the payload based at least on the transmit equalization matrix; and
      transmit, to a second wireless device, the payload comprising at least the sidelink control data and the transmit equalization matrix.

2. The apparatus of claim 1, further comprising a transceiver coupled to the at least one processor, the transceiver being configured to:
   transmit, to the second wireless device, the payload comprising at least the sidelink control data and the transmit equalization matrix.

3. The apparatus of claim 1, wherein the first part of the sidelink control data at least comprises scheduling control and parameters to decode the second part of the sidelink control data.

4. The apparatus of claim 1, wherein the second part of the sidelink control data at least comprises transmit scaling coefficients or log-likelihood ratio (LLR) scaling coefficients.

5. The apparatus of claim 4, wherein the second part of the sidelink control data comprises a reduced modulation and coding scheme (MCS), a code rate, or a modulation order that is less than a remaining data within the payload.

6. The apparatus of claim 5, wherein the second part of the sidelink control data is transmitted on a separate transport block than the remaining data within the payload.

7. The apparatus of claim 1, wherein the at least one processor is configured to:
   update the transmit equalization matrix based on an updated channel state information (CSI) received from the second wireless device.

8. The apparatus of claim 7, wherein the at least one processor is configured to:
   transmit updated transmit scaling coefficients or log-likelihood ratio (LLR) scaling coefficients of the second part of the sidelink control data in response to an update to the transmit equalization matrix.

9. The apparatus of claim 1, wherein to apply the equalization procedure the at least one processor is configured to:

apply a transmit scaling factor to at least the sidelink control data.

10. A method of wireless communication at a first wireless device, comprising:

configuring a payload comprising at least sidelink control data and a transmit equalization matrix for transmission within a transmit pre-equalization refresh period, wherein the sidelink control data comprising at least one of a first part or a second part;

applying an equalization procedure to the payload based at least on the transmit equalization matrix; and transmitting, to a second wireless device, the payload comprising at least the sidelink control data and the transmit equalization matrix.

11. The method of claim 10, wherein the first part of the sidelink control data at least comprises scheduling control and parameters to decode the second part of the sidelink control data.

12. The method of claim 10, wherein the second part of the sidelink control data at least comprises transmit scaling coefficients or log-likelihood ratio (LLR) scaling coefficients.

13. The method of claim 12, wherein the second part of the sidelink control data comprises a reduced modulation and coding scheme (MCS), a code rate, or a modulation order that is less than a remaining data within the payload.

14. The method of claim 13, wherein the second part of the sidelink control data is transmitted on a separate transport block than the remaining data within the payload.

15. The method of claim 10, further comprising:

updating the transmit equalization matrix based on an updated channel state information (CSI) received from the second wireless device.

16. The method of claim 15, further comprising:

transmitting updated transmit scaling coefficients or log-likelihood ratio (LLR) scaling coefficients of the second part of the sidelink control data in response to an update to the transmit equalization matrix.

17. The method of claim 10, wherein applying the equalization procedure further comprising:

applying a transmit scaling factor to at least the sidelink control data.

18. An apparatus for wireless communication at a second wireless device, comprising:

at least one memory; and at least one processor coupled to the at least one memory and, based at least in part on information stored in the at least one memory, the at least one processor, individually or in any combination, is configured to cause the apparatus to:

receive, from a first wireless device, a payload comprising at least sidelink control data and a transmit equalization matrix, wherein the sidelink control data comprising at least one of a first part or a second part; and process the payload based at least on the sidelink control data and the transmit equalization matrix.

19. The apparatus of claim 18, further comprising a transceiver coupled to the at least one processor, the transceiver being configured to:

receive, from the first wireless device, the payload comprising at least the sidelink control data and the transmit equalization matrix, wherein the sidelink control data comprising at least one of the first part or the second part.

20. The apparatus of claim 18, wherein the first part of the sidelink control data at least comprises scheduling control and parameters to decode the second part of the sidelink control data.

21. The apparatus of claim 18, wherein the second part of the sidelink control data at least comprises transmit scaling coefficients or log-likelihood ratio (LLR) scaling coefficients.

22. The apparatus of claim 21, wherein the second part of the sidelink control data comprises a reduced modulation and coding scheme (MCS), a code rate, or a modulation order that is less than a remaining data within the payload.

23. The apparatus of claim 22, wherein the second part of the sidelink control data is transmitted on a separate transport block than the remaining data within the payload.

24. The apparatus of claim 18, wherein the at least one processor is configured to:

transmit, to the first wireless device, an updated channel state information (CSI).

25. The apparatus of claim 24, wherein the at least one processor is configured to:

receive updated transmit scaling coefficients or log-likelihood ratio (LLR) scaling coefficients in response to transmission of the update CSI.

26. The apparatus of claim 18, wherein the sidelink control data comprises the first part and the second part, wherein the second part comprises information related to an equalization procedure applied at the first wireless device.

27. The apparatus of claim 26, wherein the first part indicates that the equalization procedure was applied at the first wireless device.

28. A method of wireless communication at a second wireless device, comprising:

receiving, from a first wireless device, a payload comprising at least sidelink control data and a transmit equalization matrix, wherein the sidelink control data comprising at least one of a first part or a second part; and processing the payload based at least on the sidelink control data and the transmit equalization matrix.

29. The method of claim 28, further comprising:

transmitting, to the first wireless device, an updated channel state information (CSI).

30. The method of claim 29, further comprising:

receiving updated transmit scaling coefficients or log-likelihood ratio (LLR) scaling coefficients in response to transmission of the update CSI.

* * * * *